(12) United States Patent
Wong

(10) Patent No.: US 12,295,027 B2
(45) Date of Patent: May 6, 2025

(54) METHODS AND COMMUNICATIONS DEVICES FOR TRANSMISSION OF UPLINK SIGNALS ACCORDING TO PRIORITIES

(71) Applicant: Sony Group Corporation, Tokyo (JP)

(72) Inventor: Shin Horng Wong, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 364 days.

(21) Appl. No.: 17/791,926

(22) PCT Filed: Jan. 26, 2021

(86) PCT No.: PCT/EP2021/051755
§ 371 (c)(1),
(2) Date: Jul. 11, 2022

(87) PCT Pub. No.: WO2021/156107
PCT Pub. Date: Aug. 12, 2021

(65) Prior Publication Data
US 2023/0046263 A1     Feb. 16, 2023

(30) Foreign Application Priority Data

Feb. 3, 2020    (EP) ..................................... 20155210

(51) Int. Cl.
*H04W 72/566*     (2023.01)
*H04W 72/21*      (2023.01)

(52) U.S. Cl.
CPC ......... *H04W 72/569* (2023.01); *H04W 72/21* (2023.01)

(58) Field of Classification Search
CPC ............................ H04W 72/569; H04W 72/21
See application file for complete search history.

(56) References Cited

U.S. PATENT DOCUMENTS

2019/0223205 A1    7/2019  Papasakellariou
2020/0022144 A1*   1/2020  Papasakellariou .... H04W 72/23
(Continued)

FOREIGN PATENT DOCUMENTS

WO    WO-2020041269 A1  *  2/2020

OTHER PUBLICATIONS

International Search Report and Written Opinion mailed on Jan. 26, 2021, received for PCT Application PCT/EP2021/051755, filed on May 3, 2021, 13 pages.

(Continued)

*Primary Examiner* — Deepa Belur
(74) *Attorney, Agent, or Firm* — XSENSUS LLP

(57) ABSTRACT

A method of operating a communications device in a wireless communications network is provided. The method comprises determining that the communications device should transmit at least two uplink signals to the wireless communications network, wherein the uplink signals are each to be transmitted in a set of uplink resources of a wireless access interface, determining that the set of uplink radio resources in which a first of the uplink signals should be transmitted at least partially overlaps the set of uplink radio resources in which a second of the uplink signals should be transmitted, wherein the first uplink signal has a different one of a plurality of physical layer priority levels to the second uplink signal, and detecting an indication of whether the first uplink signal and the second uplink signal should be multiplexed.

20 Claims, 7 Drawing Sheets

(56) References Cited

U.S. PATENT DOCUMENTS

| | | | | |
|---|---|---|---|---|
| 2020/0314900 | A1* | 10/2020 | Hosseini | H04W 74/0858 |
| 2020/0329471 | A1* | 10/2020 | Zhang | H04L 1/1812 |
| 2021/0321432 | A1* | 10/2021 | Yoshimura | H04L 1/1861 |
| 2022/0279559 | A1* | 9/2022 | Wong | H04W 72/569 |
| 2022/0353698 | A1* | 11/2022 | Jang | H04L 5/0053 |
| 2024/0260042 | A1* | 8/2024 | Lu | H04W 72/21 |

OTHER PUBLICATIONS

Fujitsu, "UCI enhancements for URLLC", 3GPP TSG RAN WG1 #97, R1-1906583, May 13-17, 2019, 4 pages.

Holma et al., "LTE for UMTS OFDMA and SC-FDMA Based Radio Access", John Wiley & Sons, 2009, pp. 25-27.

Huawei et al., "Discussion on partially overlapped PUCCH and PUSCH", 3GPP TSG RAN WG1 #92, R1-1801788, Feb. 26-Mar. 2, 2018, 5 pages.

Oppo, "Summary#2 on UCI enhancements for URLLC", 3GPP TSG RAN WG1 #97, R1-1907777, May 13-17, 2019, 20 pages.

Ericsson, "UCI Enhancements for NR URLLC", 3GPP TSG RAN WG1 Meeting #96, R1-1901594, Feb. 25-Mar. 1, 2019, pp. 1-10.

Huawei et al., "UCI enhancements for URLLC,", 3GPP TSG RAN Meeting #96b, R1-1903955, Apr. 8-12, 2019, 7 pages.

Huawei et al., "Physical layer enhancements for NR ultra-reliable and low latency communication (URLLC)", 3GPP TSG RAN Meeting #83, RP-190726, Mar. 18-21, 2019, 5 pages.

Nokia et al., "Enhanced Industrial Internet of Things (IOT) and URLLC support", 3GPP TSG RAN Meeting #86, RP-193233, Dec. 9-12, 2019, 5 pages.

3GPP, "Study on Scenarios and Requirements for Next Generation Access Technologies (Release 14)", 3GPP TR 38.913 V14.3.0, Jun. 2017, pp. 1-39.

3GPP, "NR; Physical layer procedures for control (Release 15)", 3GPP TS 38.213 V15.8.0, Dec. 2019, pp. 1-109.

ZTE, "Draft CR on time domain behavior of SRS for configured grant PUSCH", 3GPP TSG RAN WG1 Meeting #96bis, R1-1904754, Apr. 8-12, 2019, 3 pages.

3GPP, "NR; Physical layer procedures for control (Release 16)", 3GPP TS 38.213 V16.0.0, Dec. 2019, pp. 1-146.

* cited by examiner

METHODS AND COMMUNICATIONS DEVICES FOR TRANSMISSION OF UPLINK SIGNALS ACCORDING TO PRIORITIES

CROSS-REFERENCE TO RELATED APPLICATIONS

The present application is based on PCT filing PCT/EP2021/051755, filed Jan. 26, 2021, which claims priority to EP 20155210.6, filed Feb. 3, 2020, the entire contents of each are incorporated herein by reference.

BACKGROUND

Field of Disclosure

The present disclosure relates to communications devices, infrastructure equipment and methods for the transmission of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems, such as those based on the 3GPP defined UMTS and Long Term Evolution (LTE) architecture, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to routinely and efficiently support communications with an ever increasing range of devices associated with a wider range of data traffic profiles and types than existing systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for future wireless communications networks, for example those which may be referred to as 5G or new radio (NR) systems/new radio access technology (RAT) systems, as well as future iterations/releases of existing systems, to efficiently support connectivity for a wide range of devices associated with different applications and different characteristic data traffic profiles and requirements.

One example of a new service is referred to as Ultra Reliable Low Latency Communications (URLLC) services which, as its name suggests, requires that a data unit or packet be communicated with a high reliability and with a low communications delay. Another example of a new service is Enhanced Mobile Broadband (eMBB) services, which are characterised by a high capacity with a requirement to support up to 20 Gb/s. URLLC and eMBB type services therefore represent challenging examples for both LTE type communications systems and 5G/NR communications systems.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method of operating a communications device in a wireless communications network. The method comprises receiving, determining that the communications device should transmit at least two uplink signals to the wireless communications network, wherein the uplink signals are each to be transmitted in a set of uplink resources of a wireless access interface, determining that the set of uplink radio resources in which a first of the uplink signals should be transmitted at least partially overlaps the set of uplink radio resources in which a second of the uplink signals should be transmitted, wherein the first uplink signal has a different one of a plurality of physical layer priority levels to the second uplink signal, and detecting an indication of whether the first uplink signal and the second uplink signal should be multiplexed. If the indication indicates that the first uplink signal and the second uplink signal should be multiplexed, the method further comprises multiplexing the first uplink signal and the second uplink signal into a third uplink signal, and transmitting the third uplink signal. If the indication indicates that the first uplink signal and the second uplink signal should not be multiplexed, the method further comprises transmitting only the one of the first uplink signal and the second uplink signal that has a higher physical layer priority level.

Embodiments of the present technique, which in addition to methods of operating communications devices relate to methods of operating infrastructure equipment, communications devices and infrastructure equipment, and circuitry for communications devices and infrastructure equipment, allow for more efficient use of radio resources by a communications device.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
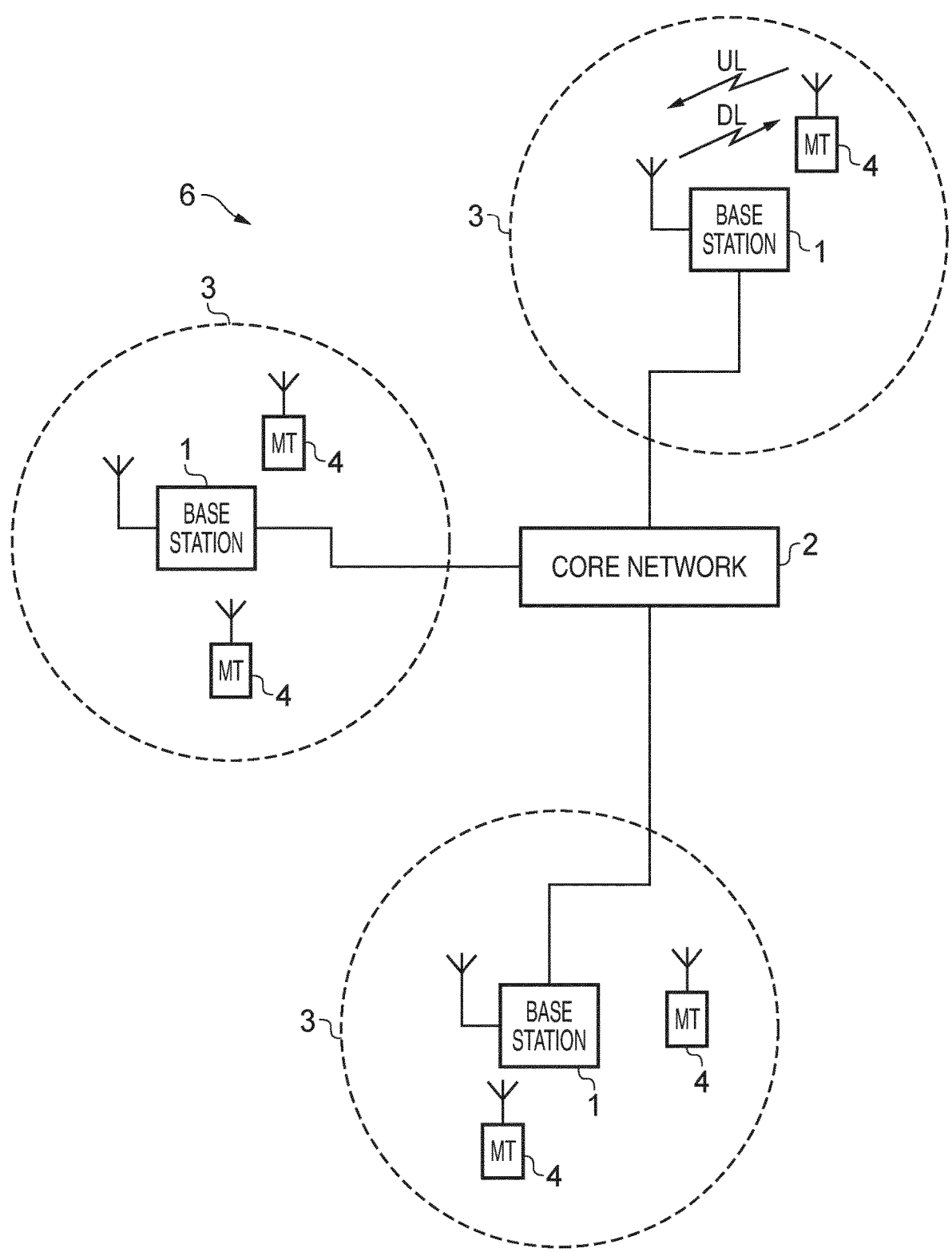
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4. Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth. Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
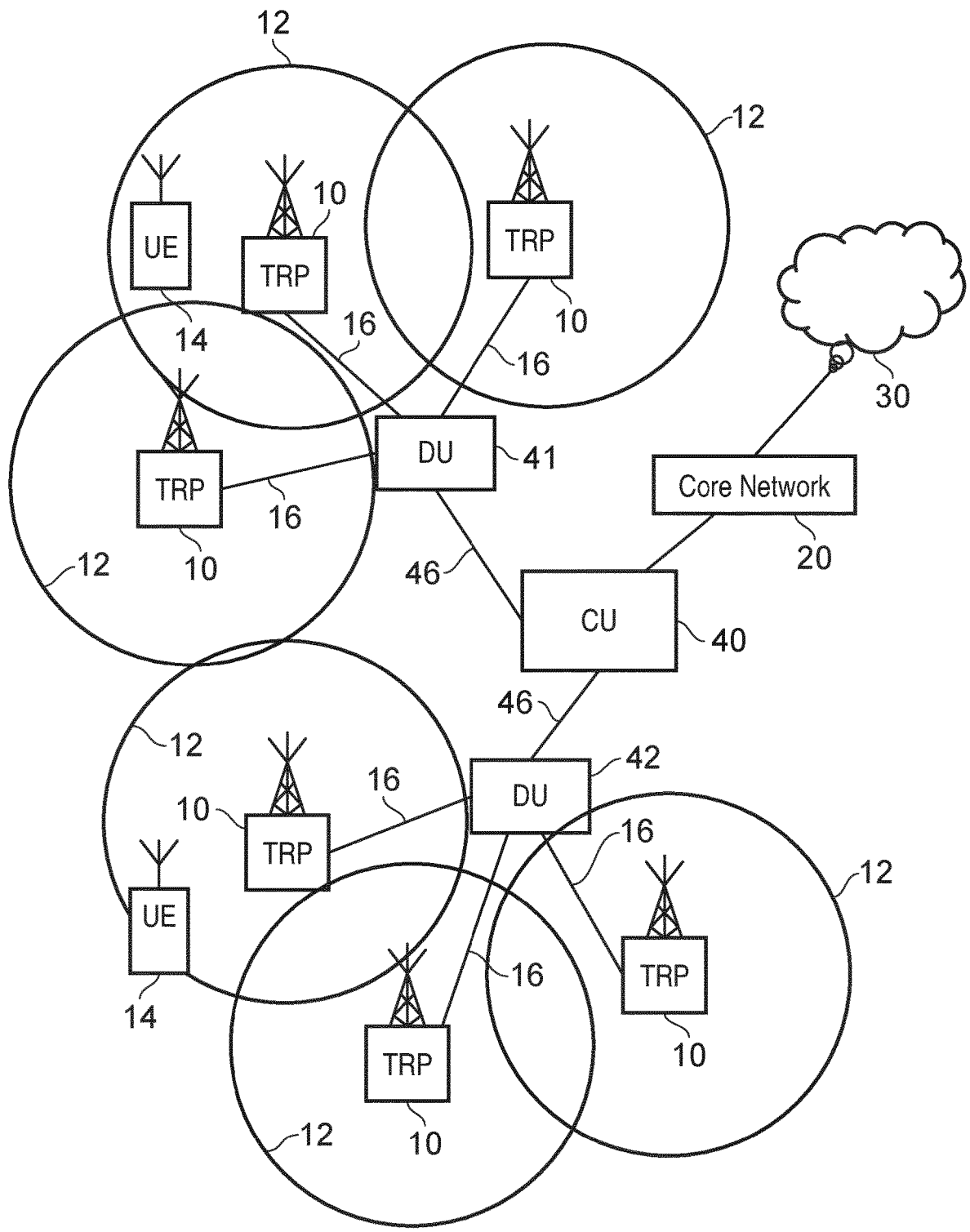
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU)

40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
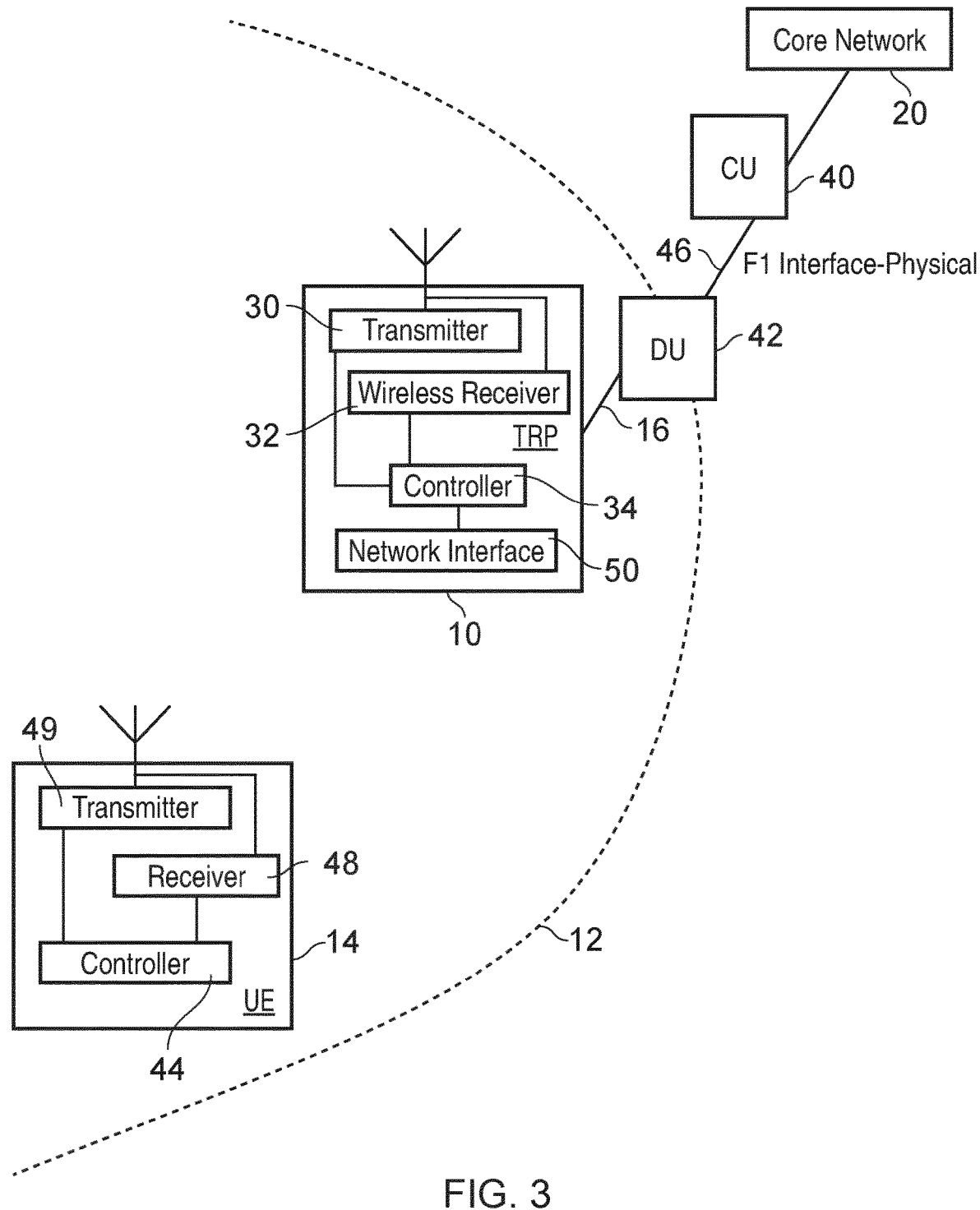
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP10 to the DU 42 and the F1 interface 46 from the DU 42 to the CU 40.

5G and eURLLC

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable and Low Latency Communications (URLLC) services are for a reliability of $1-10^{-5}$ (99.999%) or higher for one transmission of a 32 byte packet is required to be transmitted from the radio protocol layer 2/3 SDU ingress point to the radio protocol layer 2/3 SDU egress point of the radio interface within 1 ms with a reliability of 99.999% to 99.9999% [2]. Massive Machine Type Communications (mMTC) is another example of a service which may be supported by NR-based communications networks. In addition, systems may be expected to support further enhancements related to Industrial Internet of Things (IIoT) in order to support services with new requirements of high availability, high reliability, low latency, and in some cases, high-accuracy positioning.

Enhanced URLLC (eURLLC) [3] specifies features that require high reliability and low latency, such as factory automation, transport industry, electrical power distribution, etc. It should be appreciated that the Uplink Control Information (UCI) for URLLC and eMBB will have different requirements. Hence, one of the current objectives of eURLLC is to enhance the UCI to support URLLC, where the aim is to allow more frequent Physical Uplink Control Channels (PUCCHs) carrying Hybrid Automatic Repeat Request Acknowledgement (HARQ-ACK) feedback per slot, and to support multiple HARQ-ACK codebooks for different traffic services. Another objective, detailed in [4], is to further enhance the eURLLC feature by introducing intra-UE multiplexing of uplink transmissions with different Physical Layer priority levels.

Intra-UE Uplink Transmission Collision in Rel-15

In Rel-15, there are no priority levels at the Physical Layer, and when two UL transmissions collide, their information is multiplexed and transmitted using a single channel. The possible collisions are a PUCCH colliding with a PUSCH, or a PUCCH colliding with another PUCCH. It would be appreciated by those skilled in the art that although there are no priority levels defined in Rel-15 for the Physical Layer, priority levels are defined for the Medium Access Control (MAC) Layer in Rel-15, where there are 16 priority levels.

The PUCCH carries Uplink Control Information (UCI), such as HARQ-ACK feedback for PDSCH, Scheduling Requests (SRs) and Channel State Information (CSI). There are 5 PUCCH formats, namely Format 0, 1, 2, 3 & 4.

PUCCH Format 0 carries up to 2 HARQ-ACK bits and a positive SR. PUCCH Format 1 carries up to 2 bits of information which can be either 2 HARQ-ACK bits or 1 HARQ-ACK & 1 SR bit. PUCCH Formats 2, 3 & 4 can carry more than 2 bits, which can consist of HARQ-ACK, SRs and CSI. It should be noted that HARQ-ACK is a term of art used to describe HARQ feedback for a PDSCH, where despite the name the feedback itself can be either a positive acknowledgement (termed "ACK") or a negative acknowledgement (termed "NACK").

A HARQ-ACK feedback is transmitted to the gNB, in response to Physical Downlink Shared Channel (PDSCH) scheduling, to inform the gNB whether the UE has successfully decoded the PDSCH or not. For a PDSCH ending in slot n, the corresponding PUCCH carrying the HARQ-ACK is transmitted in slot $n+K_1$, where the value of $K_1$ is indicated in the field "PDSCH-to-HARQ_feedback timing indicator" of the DL Grant (carried by Downlink Control Information (DCI) Format 1_0 or DCI Format 1_1). The PUCCH resource used is indicated in the "PUCCH Resource Indicator" (PRI) field of the DL Grant.

Figure 4:
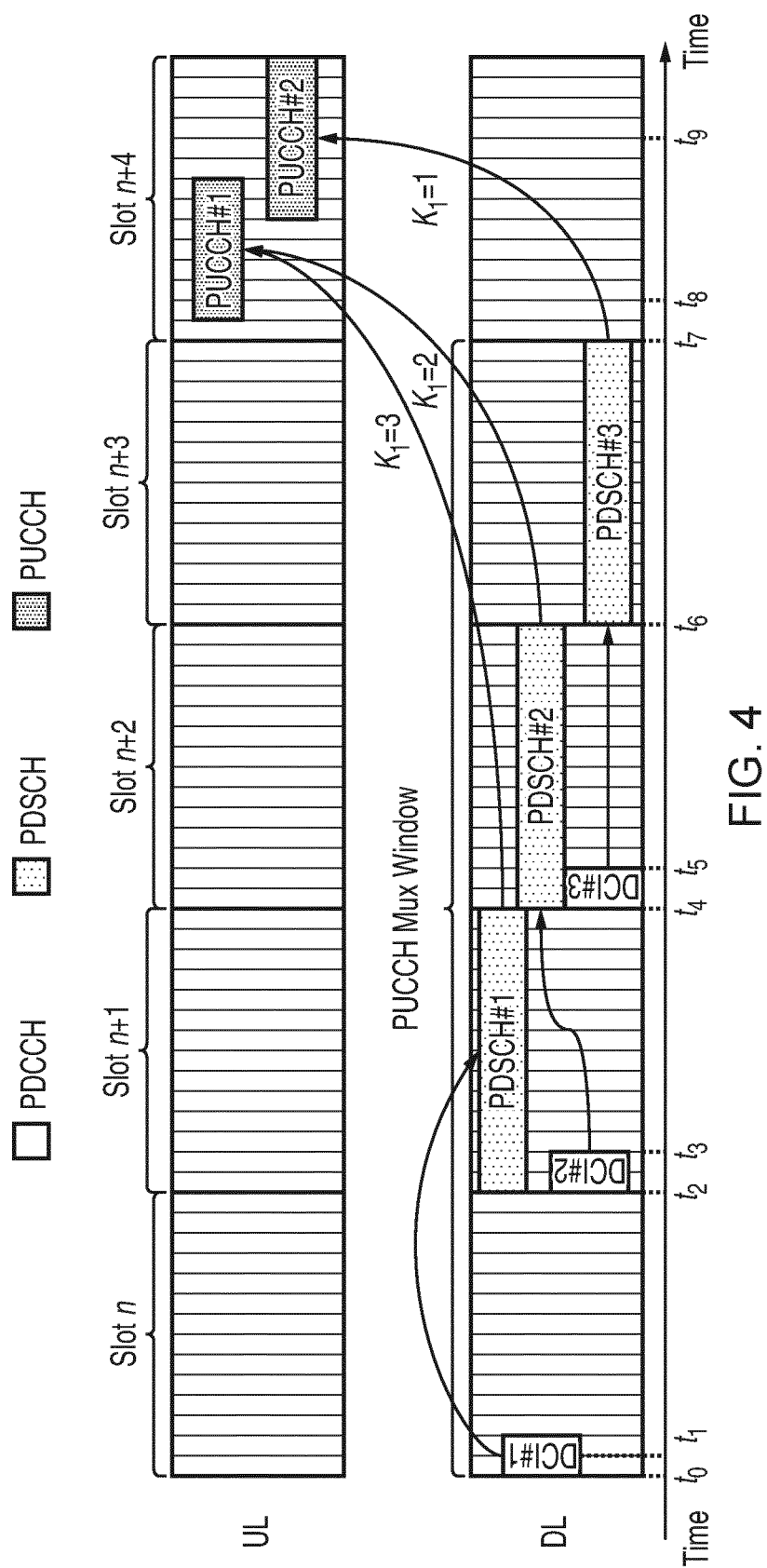
FIG. 4 shows a flow diagram illustrating a process of how a User Equipment (UE) may multiplex multiple Hybrid Automatic Repeat Request Acknowledgements (HARQ-ACKs) into a single Physical Uplink Control Channel (PUCCH)

Multiple (different) PDSCHs can point to the same slot for transmissions of their respective HARQ-ACKs and the bits of these HARQ-ACKs (in the same slot) are then multiplexed by the UE into a single PUCCH, where the PUCCH resource is determined by the DL Grant scheduling the last PDSCH. Hence, a PUCCH can contain multiple HARQ-ACKs for multiple PDSCHs. An example is shown in FIG. 4, in which three DL Grants are transmitted to the UE via DCI #1, DCI #2 and DCI #3 in slot n, n+1 and n+2 respectively. DCI #1, DCI #2 and DCI #3 schedule PDSCH #1, PDSCH #2 and PDSCH #3 respectively. DCI #1, DCI #2 and DCI #3 further indicate $K_1=3$, $K_1=2$ and $K_1=1$ respectively. Since the $K_1$ values indicate that the HARQ-ACK feedbacks for PDSCH #1, PDSCH #2 and PDSCH #3 are all transmitted in slot n+4, the UE multiplexes all three of these HARQ-ACKs into a single PUCCH. The PUCCH Multiplexing Window is a time window during which PDSCHs can be multiplexed into that single PUCCH, where this PUCCH Multiplexing Window depends on the range of $K_1$ values. In the example shown by FIG. 4, the PUCCH Multiplexing Window is from Slot n to Slot n+3, which means the max $K_1$ value is 4 slots.

The PUCCH resource is determined based on the DL Grant scheduling the last PDSCH in the PUCCH Multiplexing Window, since the UE only knows the total number of HARQ-ACK bits after the last PDSCH is received. Additionally, the UE follows the PUCCH Resource Indicator (PRI) in the DL Grant of the last PDSCH to determine which PUCCH resource within a PUCCH resource set to use. In the example in in FIG. 4, since PDSCH #3 is the last PDSCH to be scheduled with corresponding PUCCH in slot n+4, the HARQ-ACKs for all these PDSCHs with corresponding PUCCH in that slot are multiplexed together using PUCCH #2, which is associated with PDSCH #3.

When a PUCCH carrying a positive SR (i.e. SR is triggered) collides with another PUCCH carrying a HARQ-ACK, the multiplexing of SR & HARQ-ACK depends on the PUCCH format used. This is summarised in Table I below. It should be noted that for Scenario 2 in Table I below, a positive SR is not transmitted.

TABLE I

SR & HARQ-ACK multiplexing

| Scenario | PUCCH Format SR (1st PUCCH) | PUCCH Format HARQ-ACK (2nd PUCCH) | Multiplexing Behaviour |
|---|---|---|---|
| 1 | 0 or 1 | 0 | SR & HARQ-ACK are multiplexed into 2nd PUCCH using Format 0 |
| 2 | 0 | 1 | Drop SR and transmit only HARQ-ACK using 2nd PUCCH with Format 1. |
| 3 | 1 | 1 | If SR is positive then transmit HARQ-ACK using 1st PUCCH (Format 1) otherwise (if SR is negative) then transmit HARQ-ACK using 2nd PUCCH (Format 1) |
| 4 | 0, 1 | 2, 3 or 4 | Multiplex SR & HARQ-ACK using 2nd PUCCH. |

CSI reports can be configured to be periodic, aperiodic or semi-persistent. Periodic CSI is transmitted using PUCCH, where the CSI report is sent periodically. Aperiodic CSI is transmitted using PUSCH and is triggered by a CSI Request field in the UL Grant, where only a single CSI report is sent. In semi-persistent CSI, the CSI report is sent periodically once it is activated by lower layers and is stopped when deactivated by lower layers. Semi-persistent CSI can be configured to transmit on PUSCH or PUCCH, where semi-persistent CSI on PUSCH is activated & deactivated by DCI whilst semi-persistent on PUCCH is activated & deactivated by MAC Control Element (CE).

In Rel-15, when a PUCCH carrying CSI collides with another PUCCH carrying HARQ-ACK with or without SR, the UE multiplexes the CSI & HARQ-ACK/SR if the RRC parameter "simultaneousHARQ-ACK-CSI" is set to TRUE. Otherwise the UE drops the CSI. This parameter is part of the PUCCH configuration and hence is applicable to all PUCCH transmissions in the UE. The PUCCH resource used to transmit the multiplexed UCI (CSI & HARQ-ACK/SR) is selected from all the overlapping PUCCHs.

In Rel-15, when UCI carried by PUCCH (or CSI carried by PUSCH) collides with PUSCH carrying data, the UCI bits and data bits are multiplexed and transmitted on the PUSCH. The multiplexing is done by piggybacking the UCI onto the PUSCH resource, i.e. some of the allocated PUSCH resources are used to carry the UCI, which will reduce the resources for the PUSCH data. The HARQ-ACK bits are multiplexed first, and are followed by CSI bits. The number of resources (i.e. Resource Elements) that can be used is determined by two parameters, an offset $\beta_{PUSCH}$ and a scaling factor $\alpha$. The $\beta_{PUSCH}$ offset is signalled by the DCI carrying the UL Grant for the PUSCH using the "beta_offset indicator" field, which indicates one of four configured $\beta_{PUSCH}$ offset values. These four $\beta_{PUSCH}$ offset values are selected from a table which is defined in [5], where the minimum value is 1, i.e. $\beta_{PUSCH} \geq 1$. The scaling factor $\alpha = \{0.5, 0.65, 0.8, 1\}$ is RRC configured, and this scaling factor sets the maximum number of REs (Resource Elements) as a percentage of the number of PUSCH REs that can be used for UCI.

Figure 5:
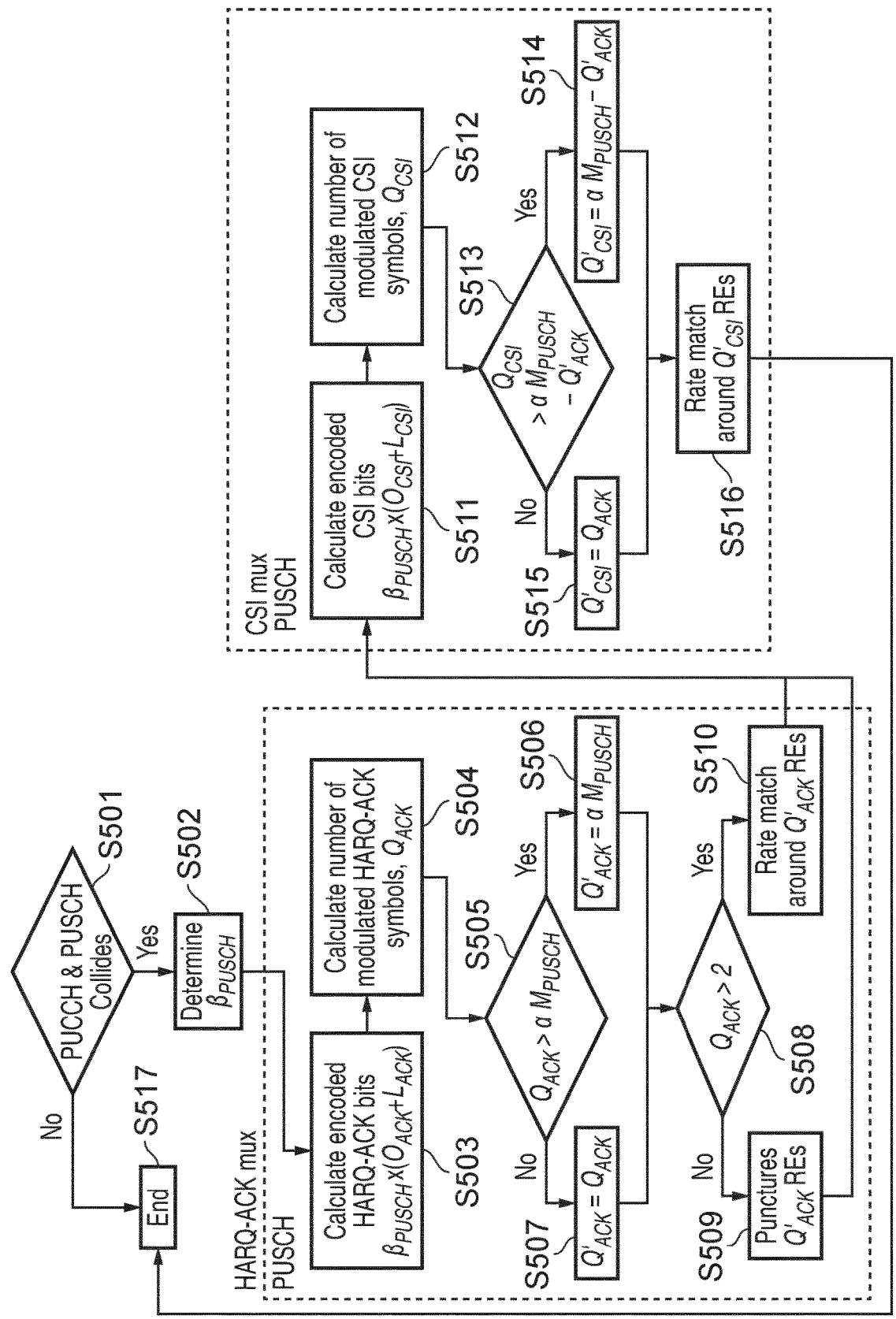
FIG. 5 shows an example of how a UE may multiplex Uplink Control Information onto a Physical Uplink Shared Channel (PUSCH)

The multiplexing procedure is summarised in the flow chart in FIG. 5. When a PUCCH & PUSCH collide, which is determined in step S501, the UE calculates in step S503 the number of HARQ-ACK bits $O_{ACK}$ and the number of CRC bits $L_{ACK}$. This is then multiplied by the $\beta_{PUSCH}$ indicated in the UL Grant (and determined by the UE in step S502) to determine the total bits required to carry these HARQ-ACKs. The $\beta_{PUSCH}$ offset is effectively the level of redundancies used for the HARQ-ACKs information. The UE then calculates in step S504 the number of modulated symbols $Q_{ACK}$ (where the modulation used depends on the scheduled PUSCH) and hence the number of REs (Resource Element) required. The UE then determines the maximum allowed PUSCH REs that can be used for UCI by multiplying the scaling factor $\alpha$ with the number of PUSCH REs $M_{PUSCH}$. The UE checks in step S505 that $Q_{ACK}$ does not exceed this maximum REs and if it does (i.e. $Q_{ACK} > \alpha M_{PUSCH}$) then the actual number of REs that can be used, as is determined by the UE in step S506, $Q'_{ACK} = \alpha M_{PUSCH}$. Otherwise the actual number of REs is the calculated number of REs, i.e. $Q'_{ACK} = Q_{ACK}$, and is determined so by the UE in step S507. The UE then piggybacks the $Q'_{ACK}$ HARQ-ACK modulated symbols to the PUSCH where puncturing is used in step S509 for $O_{ACK} \leq 2$ bits (which the UE checks in step S508), otherwise the PUSCH data symbols are rate matched in step S510 around $Q'_{ACK}$ symbols.

This process is then repeated for the CSI, i.e. UE calculates in step S511 the number of CSI bits $O_{CSI}$ and its CRC $L_{CSI}$ and multiply it with the offset $\beta_{PUSCH}$. The UE determines in step S512 the number of modulated symbols $Q_{CSI}$ and hence the number of REs required to carry the CSI. The UE then checks in step S513 that $Q_{CSI}$ does not exceed the remaining PUSCH REs ($\alpha M_{PUSCH} - Q'_{ACK}$), and if it does (i.e. $Q_{CSI} > \alpha M_{PUSCH} - Q'_{ACK}$) then the actual number of REs for CSI $Q_{CSI}$ takes up the remaining PUSCH REs in step S514, i.e. $Q'_{CSI} = \alpha M_{PUSCH} - Q'_{ACK}$. Otherwise, as determined by the UE in step S515, $Q'_{CSI}$ is the calculated number of CSI REs, i.e. $Q'_{CSI} = Q_{CSI}$. For CSI, only rate matching is used, i.e. the PUSCH data is rate matched in step S516 around the $Q'_{CSI}$ modulated symbols. It should be noted that the CSI UCI may consists of two types, i.e. Type 1 CSI and Type 2 CSI, the multiplexing process is performed on Type 1 CSI first followed by Type 2 CSI. The process then ends in step S517.

The UCI-onto-PUSCH multiplexing prioritises HARQ-ACK bits followed by Type 1 CSI and finally Type 2 CSI. It should be noted that if there are not sufficient REs in the PUSCH, then part of the CSI bits are multiplexed, and if there are no REs left, the CSI may not be multiplexed.

Intra-UE Uplink Transmission Collision in Rel-16

A UE can be configured to provide eMBB and URLLC services. Since eMBB and URLLC have different latency requirements, their uplink transmissions may collide. For example, after an eMBB uplink transmission has been scheduled, an urgent URLLC packet arrives which would need to be scheduled immediately and transmission may collide with the eMBB transmission. In order to handle such intra-UE collisions with different latency & reliability requirements, two priority levels at the Physical Layer were introduced in Rel-16. In Rel-16 intra-UE prioritisation is used, that is, when two UL transmissions with different Physical Layer priority levels collide, the UE will drop the lower priority transmission. If both UL transmissions have the same priority level, then the UE reuse Rel-15 procedures as described in the previous sections.

It has been recognised that dropping lower priority transmissions can lead to inefficient resource usage. For example, dropping a PUCCH carrying HARQ-ACKs for multiple eMBB PDSCHs, due to collision with a high priority PUCCH/PUSCH, may result in multiple eMBB PDSCHs being retransmitted. Since each eMBB PDSCH consumes a large number of resources, such retransmissions will lead to inefficient utilisation of resources. Hence, one of the objectives of Rel-17 eURLLC is to introduce intra-UE multiplexing of UL transmissions of different Physical Layer priority levels, i.e. allowing lower priority UL transmissions to be transmitted by multiplexing it with a higher priority UL transmission. Since in Rel-16, when two UL transmissions in the same UE collides, the UE will always drop the lower priority transmission, it presently isn't clear when or how the UE would known when to multiplex these UL transmissions in Rel-17. Embodiments of the present technique seek to provide solutions to such a problem, and allow for increased efficiency of resource usage.

Intra-UE Multiplexing Indicator

Figure 6:
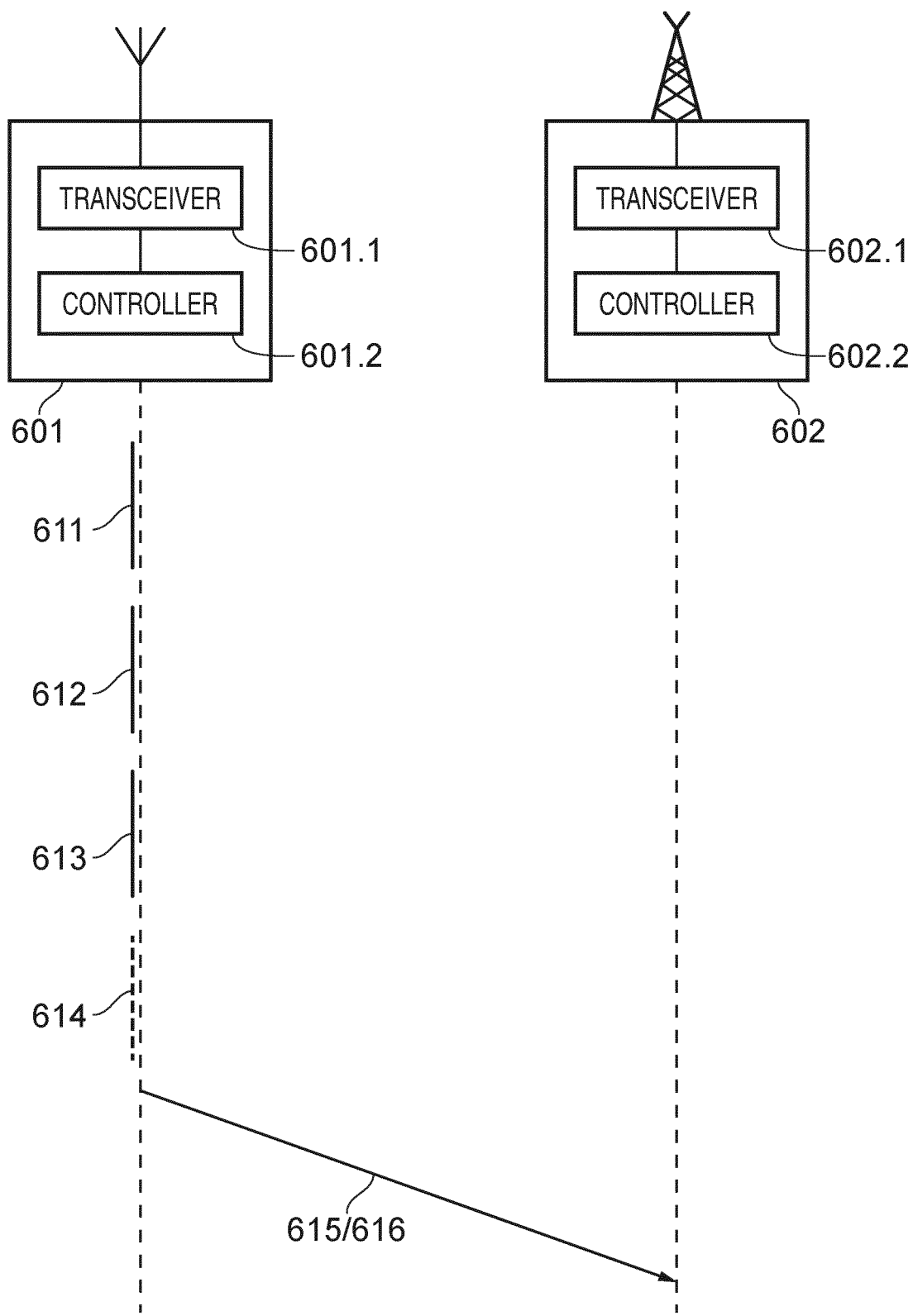
FIG. 6 shows a part schematic, part message flow diagram representation of a wireless communications network comprising a communications device and an infrastructure equipment in accordance with embodiments of the present technique.

FIG. 6 shows a part schematic, part message flow diagram representation of a wireless communications network comprising a communications device 601 and an infrastructure equipment 602 in accordance with at least some embodiments of the present technique. The communications device 601 is configured to transmit data to or receive data from the wireless communications network, for example, to and from the infrastructure equipment 602, via a wireless access interface provided by the wireless communications network. The communications device 601 and the infrastructure equipment 602 each comprise a transceiver (or transceiver circuitry) 601.1, 602.1, and a controller (or controller circuitry) 601.2, 602.2. Each of the controllers 601.2, 602.2 may be, for example, a microprocessor, a CPU, or a dedicated chipset, etc.

As shown in the example of FIG. 6, the transceiver circuitry 601.1 and the controller circuitry 601.2 of the communications device 601 are configured in combination, to determine 611 that the communications device should transmit at least two uplink signals to the wireless communications network, wherein the uplink signals are each to be transmitted in a set of uplink resources of a wireless access interface, to determine 612 that the set of uplink radio resources in which a first of the uplink signals should be transmitted at least partially overlaps the set of uplink radio resources in which a second of the uplink signals should be transmitted, wherein the first uplink signal has a different one of a plurality of physical layer priority levels to the second uplink signal, and to detect 613 an indication of whether the first uplink signal and the second uplink signal should be multiplexed, wherein, if the indication indicates that the first uplink signal and the second uplink signal should be multiplexed, the controller circuitry is configured in combination with the transceiver circuitry to multiplex 614 the first uplink signal and the second uplink signal into a third uplink signal, and to transmit 615 the third uplink signal, and wherein, if the indication indicates that the first uplink signal and the second uplink signal should not be multiplexed, the controller circuitry is configured in combination with the transceiver circuitry to transmit 616 only the one of the first uplink signal and the second uplink signal that has a higher physical layer priority level.

In at least some arrangements of embodiments of the present technique, each of the uplink signals to be transmitted to the wireless communications network may be based on a downlink signal, which indicates a set of uplink radio resources of the wireless access interface in which the each of the uplink signals should be transmitted.

Essentially, embodiments of the present technique propose that an intra-UE multiplexing indicator be introduced, where this multiplexing indicator (referred to below during the description of various embodiments and arrangements of the present technique as the indication) indicates whether the UE should multiplex colliding intra-UE transmissions of different (Physical Layer) priority levels or whether the UE should simply drop the lower priority one(s) in favour of transmitting only the highest priority transmission. It should be appreciated that, in reference to the third uplink signal in the present disclosure as the multiplexed signal, this third uplink signal may be one of the first uplink signal or second uplink signal (i.e. one of these signals is multiplexed onto the other), or occupy the resources in which one of the first uplink signal or second uplink signal have been scheduled. Alternatively, the third uplink signal may be a new, separate signal scheduled in resources other than (or partially overlapping) with the resources of either of the first or second uplink signals. This recognises that the legacy behaviour (i.e. Rel-16) is to always drop the lower priority transmission in favour of the higher priority one and hence an indicator is therefore required to stop the UE from dropping the lower priority, or at least part of the lower priority transmissions, in order to reduce wastage of resources. The intra-UE multiplexing indicator can be implicit, explicit or combination of implicit & explicit indicators which are described in the following arrangements below.

Implicit Indicator

In some arrangements of embodiments of the present technique, the said intra-UE multiplexing indicator is an implicit indicator. That is, whether two UL transmissions can be multiplexed depends on the characteristics of the UL transmissions. In other words, the indication is implicit and is determined by the communications device on the basis of at least one of the first uplink signal and the second uplink signal. The following arrangements describe such characteristics.

In an arrangement of embodiments of the present technique, when two PUCCH transmissions of different Physical Layer priority levels collide, the UE multiplexes the UCIs of these two PUCCH if the total multiplexed UCI bits ($O_{UCI} = O_{UCI\text{-}URLLC} + O_{UCI\text{-}eMBB} + L_{UCI}$) do not exceed a threshold $T_{UCI}$. Here $O_{UCI\text{-}URLLC}$ is the URLLC UCI bits, $O_{UCI\text{-}eMBB}$ is the number of eMBB UCI bits and $L_{UCI}$ is the CRC. For PUCCH Format 0 and Format 1, there is no CRC bits, i.e. $L_{UCI} = 0$. If the total multiplexed UCI bits exceeds the threshold, i.e. $O_{UCI} > T_{UCI}$, the UE drops the lower priority PUCCH and transmit only the higher priority PUCCH. In other words, the first uplink signal comprises first uplink control information, and the second uplink signal comprises second uplink control information. Here, the indication may indicate that the first uplink signal and the second uplink signal should be multiplexed if the third uplink signal would comprise a total number of bits equal to or less than a threshold number of bits. Here, the total number of bits of the third uplink signal may be calculated by the communications device by adding a total number of bits of the first uplink control information, a total number of bits of the second uplink control information, and a number of bits of a Cyclic Redundancy Check, CRC, to be included within the third uplink signal.

In another arrangement of embodiments of the present technique, the said threshold $T_{UCI}$ is RRC configured. Separate thresholds can be configured for each PUCCH Physical Layer priority level. In other words, the threshold number of bits is configured via Radio Resource Control, RRC, signalling from the wireless communications network.

In another arrangement of embodiments of the present technique, the said threshold $T_{UCI}$ is dynamically indicated. This can be indicated in the DL Grant scheduling the PDSCH that is associated with the PUCCH or the UL Grant triggering an a-periodic CSI on a PUSCH. In other words, the threshold number of bits is indicated by the one of a plurality of downlink signals received by the communications device from the wireless communications network that schedules one of the first uplink signal and the second uplink signal, or alternatively, the threshold number of bits is indicated by one of the downlink signals, the one of the downlink signals indicating that the communications device should transmit an aperiodic Channel State Information, CSI, message which indicates one or more communications characteristics of an uplink data message transmitted by the communications device.

In another arrangement of embodiments of the present technique, the said threshold $T_{UCI}$ is a function of the Maximum Code Rate $R_{UCI}$ of the PUCCH. In legacy system (Rel-15), the Maximum Code Rate $R_{UCI}$ is RRC configured for the PUCCH (for all PUCCH Formats), which is used to determine the number of PRBs to use for the PUCCH transmission for a given number of UCI bits $O_{UCI}$. In other words, the threshold number of bits is dependent on a maximum code rate, the maximum code rate being configured via RRC signalling from the wireless communications network (and indicating a number of physical resource blocks required for an uplink control channel which carries uplink control information comprising a given number of bits). In an implementation $T_{UCI}=\gamma \times R_{UCI} \times N_{PUCCH}$, where $\gamma$ is a parameter configured by RRC or indicated in the DCI (scheduling the DL Grant) and $N_{PUCCH}$ is the capacity of the PUCCH (in bits). For example, $\gamma=1$ and so if the multiplexed UCI bits $O_{UCI}$ leads to the PUCCH exceeding its Maximum Code Rate, the UE drops the lower priority UCIs.

In another arrangement of embodiments of the present technique, when two PUCCH transmissions with different Physical Layer priority levels collide, the UE uses the PUCCH with the largest capacity $N_{PUCCH}$. In other words, the third uplink signal is transmitted within the one of the set of uplink radio resources in which the first uplink signal was to be transmitted and the set of uplink radio resources in which the second uplink signal was to be transmitted which has the largest capacity.

In another arrangement of embodiments of the present technique, multiple Maximum Coding Rates $R_{UCI}$ can be configured for PUCCH with different Physical Layer priority levels. This allows the network to configure different $R_{UCI}$ values for URLLC PUCCH and eMBB PUCCH. In other words, a plurality of maximum code rates are configured via RRC signalling from the wireless communications network, each of the maximum code rates being associated with one of the plurality of physical layer priority levels (and indicating a number of physical resource blocks required for an uplink control channel which carries uplink control information comprising a given number of bits). For example, the network can configure URLLC PUCCH with a Maximum Coding Rate of $R_{UCI\text{-}URLLC}$ and eMBB PUCCH with a Maximum Coding Rate of $R_{UCI\text{-}eMBB}$ such that $R_{UCI\text{-}URLLC} < R_{UCI\text{-}eMBB}$.

In an arrangement of embodiments of the present technique, when a UCI transmission (e.g. on PUCCH) and a PUSCH with different priority level collide, these UL transmissions are multiplexed if the number of resources (i.e. Resource Elements) used for UCI on the PUSCH is less than a percentage threshold $T_{PUSCH}$ of the PUSCH REs otherwise the lower priority UL transmission is dropped. In other words, the first uplink signal comprises uplink control information (for example transmitted by the communications device in response to a downlink data message received by the communications device and having been scheduled by one of a plurality of downlink signals received by the communications device from the wireless communications network), and the second uplink signal comprises uplink data (which may be scheduled by one of the downlink signals). Here, the indication may indicate that the first uplink signal and the second uplink signal should be multiplexed if an amount of uplink radio resources of the wireless access interface required to transmit the uplink control information is equal to or less than a threshold percentage amount of the set of uplink radio resources in which the second uplink signal was to be transmitted.

In an implementation, the UE firstly calculates the HARQ-ACK bits $O_{ACK}$+CRC $L_{ACK}$ as per Rel-15 procedure (see FIG. 5 as discussed previously) and applies the $\beta_{PUSCH}$ offset to determine the number of REs, i.e. $Q_{ACK}$ required to carry the HARQ-ACK feedbacks. If $Q_{ACK} > T_{PUSCH} \times M_{PUSCH}$ (where $M_{PUSCH}$ is the total REs scheduled for the PUSCH) then the UE drops the lower priority transmission. For example, if the PUSCH is URLLC and the HARQ-ACK is for eMBB PDSCH then if $Q_{ACK} > (T_{PUSCH} \times M_{PUSCH})$, the UE drops the HARQ-ACK bits, this is to ensure the URLLC PUSCH reliability is not compromised by eMBB UCI. In another example, if the PUSCH is eMBB and HARQ-ACK is for URLLC PDSCH then if $Q_{ACK} > (T_{PUSCH} \times M_{PUSCH})$, the UE drops the eMBB PUSCH and transmit only the HARQ-ACK for URLLC PDSCH. Here a high $\beta_{PUSCH}$ offset is expected for the URLLC HARQ-ACK and so if the number of REs exceed the threshold, it may not be worth transmitting the eMBB PUSCH as it may not have sufficient resources to carry both eMBB data and URLLC UCIs.

In another arrangement of embodiments of the present technique, the said threshold $T_{PUSCH}$ is a function of the scaling factor $\alpha$. In other words, the threshold percentage amount is dependent on a scaling factor, the scaling factor being configured via RRC signalling from the wireless communications network (and indicating a maximum number of resource elements that can be used for an uplink control information message as a percentage of a number of resource elements of an uplink data channel which carries uplink data). In an implementation, $T_{PUSCH}=\alpha$. This arrangement can be used for the case where the PUSCH is lower priority (i.e. eMBB). This recognises that when $Q_{ACK} > \alpha M_{PUSCH}$, the REs used to carry the URLLC HARQ-ACK is limited to the maximum allowed REs, i.e. $Q'_{ACK}=\alpha M_{PUSCH}$, which is less than the required number of REs $Q_{ACK}$. Since $Q'_{ACK} < Q_{ACK}$, the reliability requirement of the URLLC HARQ-ACK may not be met. Hence in such a scenario, it is better to drop the eMBB PUSCH and transmit the URLLC UCI bits using the required resources on the PUCCH to ensure the reliability requirement is met.

In another arrangement of embodiments of the present technique, the said threshold $T_{PUSH} \leq \alpha$. In other words, the threshold percentage amount is equal to or less than the scaling factor. This arrangement is beneficial for the case where the PUSCH is higher priority (i.e. URLLC). It should be noted that the scaling factor α can be used for multiplexing of URLLC UCI onto URLLC PUSCH. The $T_{PUSCH}$ is used for multiplexing of eMBB UCI onto URLLC PUSCH and so it is beneficial to use a smaller value.

In another arrangement of embodiments of the present technique, the $T_{PUSCH}$ is RRC Configured. In other words, the threshold percentage amount is configured via RRC signalling from the wireless communications network. Different $T_{PUSCH}$ values can be configured for low priority transmission and high priority transmission. For example, eMBB PUSCH can be configured with $T_{PUSCH}=T_{PUSCH-eMBB}$ whilst URLLC PUSCH can be configured with $T_{PUSCH}=T_{PUSCH-URLLC}$ such that $T_{PUSCH-eMBB} > T_{PUSCH-URLLC}$, i.e. more REs can be used in an eMBB PUSCH compared to those in URLLC PUSCH.

In another arrangement of embodiments of the present technique, $T_{PUSCH}$ is indicated in the DCI. In other words, the threshold percentage amount is indicated by the one of a plurality of downlink signals received by the communications device from the wireless communications network that schedules one of the first uplink signal and the second uplink signal. In an implementation, the DCI carries the UL Grant for the PUSCH. This allows different values to be indicated for different PUSCH at different time thereby offering greater flexibility for the network scheduler.

In another arrangement of embodiments of the present technique, separate scaling factors α are configured for PUSCH with different Physical Layer priority level. That is, instead of having only a single scaling factor α for all PUSCH in Rel-15, this arrangement allows different scaling factors to be configured for URLLC & eMBB PUSCH. This recognises that eMBB and URLCC can tolerate different numbers of piggybacked UCI bits since they have different reliabilities. In other words, a plurality of scaling factors are configured via RRC signalling from the wireless communications network, each of the maximum code rates being associated with one of the plurality of physical layer priority levels (and indicating a maximum number of resource elements that can be used for an uplink control information message as a percentage of a number of resource elements of an uplink data channel which carries uplink data). For example, URLLC PUSCH is configured with scaling factor $α_{URLLC}$ and eMBB PUSCH is configured with scaling factor $α_{eMBB}$ such that $α_{URLLC} < α_{eMBB}$.

Explicit Indicator

In some arrangements of embodiments of the present technique, the said intra-UE multiplexing indicator is an explicit indicator. This explicit indication may be explicitly indicated by at least one of the downlink signals, or may be configured via RRC signalling from the wireless communications network. Such explicit indications are described in the following arrangements.

In an arrangement of embodiments of the present technique the said intra-UE multiplexing is dynamically indicated. For the PUSCH, the DCI carrying the UL Grant for the PUSCH will indicate whether the PUSCH can be multiplexed with another UL transmission of a different priority. For the PUCCH, the DCI carrying the DL Grant for the PDSCH will indicate whether the corresponding PUCCH carrying HARQ-ACK can be multiplexed with another UL transmission of a different priority. In other words, the at least one of the downlink signals comprises a field indicating whether the one of the first uplink signal and the second uplink signal that is based on the at least one of the downlink signals can be multiplexed with another uplink signal of a different physical layer priority level to the one of the first uplink signal and the second uplink signal.

In another arrangement of embodiments of the present technique a new field in the DCI is introduced that indicates whether the PUSCH or the PUCCH can be multiplexed with another UL transmission (PUSCH/PUCCH) of a different priority level. In other words, the field is a new field specifically for carrying the indication. An implementation is a single bit indicating whether to multiplex or not.

In another arrangement of embodiments of the present technique an existing (Rel-15 or Rel-16) field in the DCI is used to indicate whether the PUSCH or the PUCCH can be multiplexed with another UL transmission (PUSCH/PUCCH) of a different priority level. In other words, the field is an existing field repurposed for carrying the indication. It should be noted that this DCI field is ONLY used as multiplexing indicator only when there is a collision of two UL transmissions of different Physical Layer priority level. Otherwise it is used as per legacy system.

An example for PUCCH is to use one of the "PDSCH-to-HARQ_feedback timing indicator" in the DL Grant which indicates the slot or sub-slot (where the granularity of the $K_1$ value (i.e. the time difference between end of PDSCH and the start of its corresponding PUCCH) is smaller than a slot) of the PUCCH that carries HARQ-ACK for the PDSCH. Here, if there is a collision with different Physical Layer priority level, one of the values in the "PDSCH-to-HARQ_feedback timing indicator" would indicate "NOT MULTIPLEX" in addition to a $K_1$ value (otherwise the UE do not know where to transmit the PUCCH). If there is no collision of different Physical Layer priority levels, then all the values in "PDSCH-to-HARQ_feedback timing indicator" indicates only $K_1$ value.

In another arrangement of embodiments of the present technique, for the PUSCH, the "beta_offset indicator" (i.e. the offset $β_{PUSCH}$ used for UCI multiplexing onto PUSCH) field in the UL Grant is used to implicitly indicate whether UCI can be multiplexed onto the PUSCH. In other words, the existing field comprises an offset indicator indicating a value of one of a plurality of sets each comprising a plurality of values, the indicated value being for multiplication with a number of bits of third uplink signal to determine a total number of bits required for transmission of the third uplink signal. This field size is 2 bits indicating an index to one of 4 $β_{PUSCH}$ values. One of these $β_{PUSCH}$ values can be used to indicate that multiplexing is NOT allowed, when there is a collision of two UL transmissions of different Physical Layer priority level. It should be noted some prior art [6], [7] proposes the introduction of a new $β_{PUSCH}$ offset values such as $β_{PUSCH}=0$ or $β_{PUSCH}<1$. For the case where $β_{PUSCH}=0$, the UCI would be effectively dropped, regardless of priority level of the UCI. Here, in other words then, at least one of the values of at least one of the sets indicates that the first uplink signal and the second uplink signal should not be multiplexed. This arrangement does NOT propose any changes to the existing $β_{PUSCH}$ offset values, i.e. $β_{PUSCH} \geq 1$ because it recognises that the $β_{PUSCH}$ offset is also used to multiplex UCI that has the same Physical Layer priority level as the PUSCH. That is, if the UCI and the PUSCH have the same priority level then the $β_{PUSCH}$ values function as per legacy behaviour, i.e. indicates actual values.

In another arrangement of embodiments of the present technique, multiple sets of $β_{PUSCH}$ offset values can be configured for the "beta_offset indicator" in the UL Grant, where $1^{st}$ set is used if the UCI and the PUSCH has the same Physical Layer priority level, a $2^{nd}$ set is used if UCI has lower priority level than the PUSCH and a $3^{rd}$ set is used if UCI has higher priority level than the PUSCH. In other words, the set from which the value is indicated is dependent on whether the physical layer priority levels of the first uplink signal and the physical layer priority level of the second uplink signal are the same or different. An example configuration is shown in Table II, where 3 sets of $\beta_{PUSCH}$ offset values are configured. If the UCI is associated with eMBB and the PUSCH carries URLLC traffic, then the UE uses the $2^{nd}$ set $\beta_{PUSCH}$ offset values. NOTE, in this example, one of the entries for the $2^{nd}$ set $\beta_{PUSCH}$ offset values is indicated as "NOT MULTIPLEX" which means the UE drops the UCI of a lower Physical Layer priority level (i.e. one implementation of the previously described arrangement).

TABLE II

Two sets of $\beta_{PUSCH}$ offset values

| | $\beta_{PUSCH}$ offset values | | |
|---|---|---|---|
| beta_offset indicator | $1^{st}$ Set (UCI same priority) | $2^{nd}$ Set (UCI lower priority) | $3^{rd}$ Set (UCI higher priority) |
| 00 | 2 | NOT MULTIPLEX | 4 |
| 01 | 4 | 1 | 8 |
| 10 | 8 | 2 | 10 |
| 11 | 10 | 6 | 20 |

In another arrangement of embodiments of the present technique, different Physical Layer priority levels can be configured with different $\beta_{PUSCH}$ offset values. In Rel-16, a priority level indicator was introduced in the DCI that indicates the Physical Layer priority level of the PUSCH and so if this indicator indicates that PUSCH is high priority then the UE uses one configuration of $\beta_{PUSCH}$ offset values and if it indicates low priority the UE uses another configuration of $\beta_{PUSCH}$ offset values. Each $\beta_{PUSCH}$ offset configurations can have more than 1 set of values as per previous embodiment. In other words, the set from which the value is indicated is dependent on a determination made by the communications device, based on a priority indicator in the at least one of the downlink signals, of whether the physical layer priority level of one of the first uplink or the second uplink signal is a high physical layer priority level or a low physical layer priority level (here, what is "high" and what is "low" can be predetermined and known to the communications device, signalled by the wireless communications network, or implicit based on a comparison made by the communications device between the physical layer priority level of one of the first uplink or the second uplink signal and a physical layer priority level). An example is shown in Table III, where the set of $\beta_{PUSCH}$ offset values to use depends on whether the PUSCH is indicated in the UL Grant as high priority or low priority.

TABLE III

Different sets of $\beta_{PUSCH}$ offset values for different indication of Physical Layer priority level

| | $\beta_{PUSCH}$ offset values | | | |
|---|---|---|---|---|
| | PUSCH High Priority | | PUSCH Low Priority | |
| beta_offset indicator | UCI Same Priority | UCI Different Priority | UCI Same Priority | UCI Different Priority |
| 00 | 2 | NO MUX | 1 | 4 |
| 01 | 4 | 1 | 2 | 8 |
| 10 | 8 | 2.5 | 5 | 10 |
| 11 | 10 | 5 | 8 | 20 |

In another arrangement of embodiments of the present technique, the RNTI of the DCI is used to indicate whether the scheduled PUSCH or PUCCH can be multiplexed with another UL transmission of a different priority level. In other words, the indication is explicitly indicated by a Radio Network Temporary Identifier, RNTI, of the at least one of the downlink signals.

In another arrangement of embodiments of the present technique, the DCI format would indicate whether the scheduled PUSCH or PUCCH can be multiplexed with another UL transmission of a different priority level. In other words, the indication is explicitly indicated by a format of the at least one of the downlink signals.

The dynamic indicator can be in both DCIs associated with the colliding UL transmissions, e.g. if PUCCH collides with PUSCH or another PUCCH of different Physical Layer priority levels, a dynamic indicator can be in the DCI scheduling the PDSCH of the PUCCH and another dynamic indicator can be in the DCI of the UL Grant scheduling the PUSCH. In other words, the indication comprises a first dynamic indicator explicitly indicated by a first of the downlink signals on which the first uplink signal is based and a second dynamic indicator explicitly indicated by a second of the downlink signals on which the second uplink signal is based. If there are two indicators, then the following arrangements can be used (combined or independently) to interpret these indicators:

In one such arrangement, if both dynamic indicators indicate that multiplexing is allowed then the multiplexing is done. In other words, if the first dynamic indicator and the second dynamic indicator each indicate that the first uplink signal and the second uplink signal should be multiplexed, the communications device is configured to determine that the indication indicates that the first uplink signal and the second uplink signal should be multiplexed. For example, a DL Grant for an eMBB PDSCH indicates that the PUCCH can be multiplexed whilst an UL Grant for a URLLC PUSCH also indicates that the PUSCH can be multiplexed. When the PUCCH and PUSCH collide, the UCI in the PUCCH and data in the PUSCH are multiplexed;

In another such arrangement, if one dynamic indicator indicates that multiplexing is allowed whilst another indicates multiplexing is NOT allowed, then the UE follows the instruction of the last indicator. In other words, if one of the first dynamic indicator and the second dynamic indicator indicates that the first uplink signal and the second uplink signal should be multiplexed and the other of the first dynamic indicator and the second dynamic indicator indicates that the first uplink signal and the second uplink signal should not be multiplexed, the communications device is configured to determine which of the first downlink signal and the second downlink signal was most recently received by the communications device, and to determine that the indication is the one of the first dynamic indicator and the second dynamic indicator that is indicated by the most recently received of the first downlink signal and the second downlink signal. For example, a DL Grant for an eMBB PDSCH indicates that the PUCCH can be multiplexed and at a later time, an UL Grant scheduling a URLLC PUSCH indicates that the PUSCH cannot be multiplexed. When the PUCCH and PUSCH collide, the UE drops the PUCCH associated with the eMBB PDSCH; and In a further such arrangement, if one dynamic indicator indicates that multiplexing is allowed whilst another indicates multiplexing is NOT allowed, then the UE follows the instruction of the indicator belonging to the higher Physical Layer priority level. In other words, if one of the first dynamic indicator and the second dynamic indicator indicates that the first uplink signal and the second uplink signal should be multiplexed and the other of the first dynamic indicator and the second dynamic indicator indicates that the first uplink signal and the second uplink signal should not be multiplexed, the communications device is configured to determine which of the first uplink signal and the second uplink signal has the highest physical layer priority level, and to determine that the indication is the one of the first dynamic indicator and the second dynamic indicator that is indicated by the downlink signal on which the one of the first uplink signal and the second uplink signal having the highest physical layer priority level is based. This arrangement is for case where more than two Physical Layer priority level is used. It should be noted that if there are only two priority levels then the lower priority level indicator is always overwritten.

The dynamic indicator may be configured in only one of the DCIs associated with the colliding UL transmissions. For example, if PUCCH collides with PUSCH of different Physical Layer priority levels, a dynamic indicator is configured for the DCI scheduling the PDSCH of the PUCCH but the dynamic indicator is NOT configured for the DCI of the UL Grant scheduling the PUSCH. For this scenario, we have the following arrangement of embodiments of the present technique:

In an arrangement of embodiments of the present technique, the UE follows the instruction of the dynamic multiplexing indicator when a collision occurs. Such a scenario has been previously discussed in more detail above; and In another arrangement of embodiments of the present technique, the UE follows the instruction of the dynamic multiplexing indicator only if this indicator is associated with the channel with the higher priority level. In other words, the communications device is configured to determine if the at least one of the downlink signals that explicitly indicates the indication is the downlink signal on which the one of the first uplink signal and the second uplink signal having the lowest physical layer priority level is based, and subsequently to transmit only the one of the first uplink signal and the second uplink signal that has a higher physical layer priority level. Additionally, the communications device is configured to determine if the at least one of the downlink signals that explicitly indicates the indication is the downlink signal on which the one of the first uplink signal and the second uplink signal having the highest physical layer priority level is based, and subsequently to multiplex the first uplink signal and the second uplink signal into the third uplink signal, and to transmit the third uplink signal. For example, a DL Grant for an eMBB is configured with the multiplexing indicator but the UL Grant for a URLLC PUSCH is NOT configured with the multiplexing indicator. The eMBB PUCCH and URLLC PUSCH collide, where the multiplexing indicator of the eMBB DL Grant indicates multiplexing is allowed. Since the URLLC PUSCH has higher priority and it has no indicator, the eMBB PUCCH is dropped. This arrangement useful for the case when more than 2 Physical Layer priority levels are introduced.

In another arrangement of embodiments of the present technique, the said intra-UE multiplexing indicator is RRC configured, that is, the RRC will configure the UE to use Rel-16 behaviour of dropping lower priority transmissions or use Rel-17 behaviour of multiplexing transmissions of different priority levels. In other words, the indication is configured via RRC signalling from the wireless communications network. Here, in at least some implementations of this arrangement, the intra-UE multiplexing indicator is a single RRC parameter that switches between Rel-16 (dropping lower priority transmission) or Rel-17 (multiplexing) methods in handing intra-UE UL collisions.

In another arrangement of embodiments of the present technique, there is a list of different multiplexing schemes and the RRC configuration would configure which schemes to use in handling intra-UE UL collisions, i.e. they are multiple RRC parameters to configure. For example, the UE can be configured to use Rel-16 method for collision between two PUCCH of different priority levels, i.e. dropping the lower priority PUCCH but use Rel-17 method of multiplexing PUCCH and PUSCH when their transmissions collide. In other words, the indication is dependent on whether either the first uplink signal comprises uplink control information, or the first uplink signal comprises uplink data, and the indication is dependent on whether either the second uplink signal comprises uplink control information, or the second uplink signal comprises uplink data.

In another arrangement of embodiments of the present technique, the RRC will configure whether colliding uplink signals' transmission content can be multiplexed. The content can be data or UCI, where for the UCI, this can be a Scheduling Request (SR), HARQ-ACK and CSI. For example, the network can configure such that SR is not multiplex with another UL transmission of different Physical Layer priority level and so follows Rel-16 methods whilst HARQ-ACK is always multiplexed when it collides with another UL transmission of different priority (i.e. Rel-17 methods). In other words, the indication is dependent on transmission content carried by at least one of the first uplink signal and the second uplink signal.

Combined Implicit and Explicit Indicator

In some arrangements of embodiments of the present technique, the UE uses combined explicit and implicit indicators to determine whether multiplexing or dropping is used when UL transmissions of different Physical Layer priority levels collide. In other words, the indication comprises an explicit indicator and an implicit indicator, the explicit indicator either being dynamically indicated by at least one of the downlink signals or being configured by RRC signalling from the wireless communications network, the implicit indicator being determined by the communications device on the basis of at least one of the first uplink signal and the second uplink signal.

In an arrangement of embodiments of the present technique the network can RRC configure to allow multiplexing but the UE still evaluates using one of the previously described implicit indicator arrangements (e.g. the total number of UCI bits) to decide whether to multiplex or drop the lower priority UL transmission. If RRC indicates that multiplexing is NOT allowed, the UE will not use any implicit indicator and will drop the lower priority transmission. In other words, if the explicit indicator indicates that the first uplink signal and the second uplink signal should not be multiplexed, the communications device is configured to determine that the indication is the explicit indicator, and subsequently to transmit only the one of the first uplink signal and the second uplink signal that has a higher physical layer priority level.

In another arrangement of embodiments of the present technique the network can dynamically indicate that multiplexing is allowed and the UE evaluates based on implicit indicator (e.g. total number of UCI bits or percentage of occupied PUSCH used for UCI) whether to multiplex or drop the lower priority UL transmission. If DCI indicates that multiplexing is not performed, the UE will not use the implicit indicator and will drop the lower priority transmission. In other words, if the explicit indicator indicates that the first uplink signal and the second uplink signal should be multiplexed, the method comprises determining that the indication is the implicit indicator.

In at least some arrangements of embodiments of the present technique, at least one of the first uplink signal and the second uplink signal may comprise uplink control information. Here, uplink control information may comprise periodic Channel State Information, CSI, which indicates one or more communications characteristics of an uplink data message transmitted by the communications device, and/or a Scheduling Request, SR, which indicates that the communications device is requesting a set up uplink resources of the wireless access interface for transmission of an uplink data message. It should be appreciated by those skilled in the art that no DCI is required for the triggering/scheduling of such UCI in these cases. Furthermore, the uplink control information may alternatively/also comprise feedback information (i.e. a HARQ-ACK), the feedback information indicating whether or not a downlink signal was received successfully by the communications device. In this case, the UCI carrying the HARQ-ACK will have been scheduled by the DCI which provides the DL grant that schedules the downlink signal (i.e. a PDSCH).

Flow Chart Representation

Figure 7:
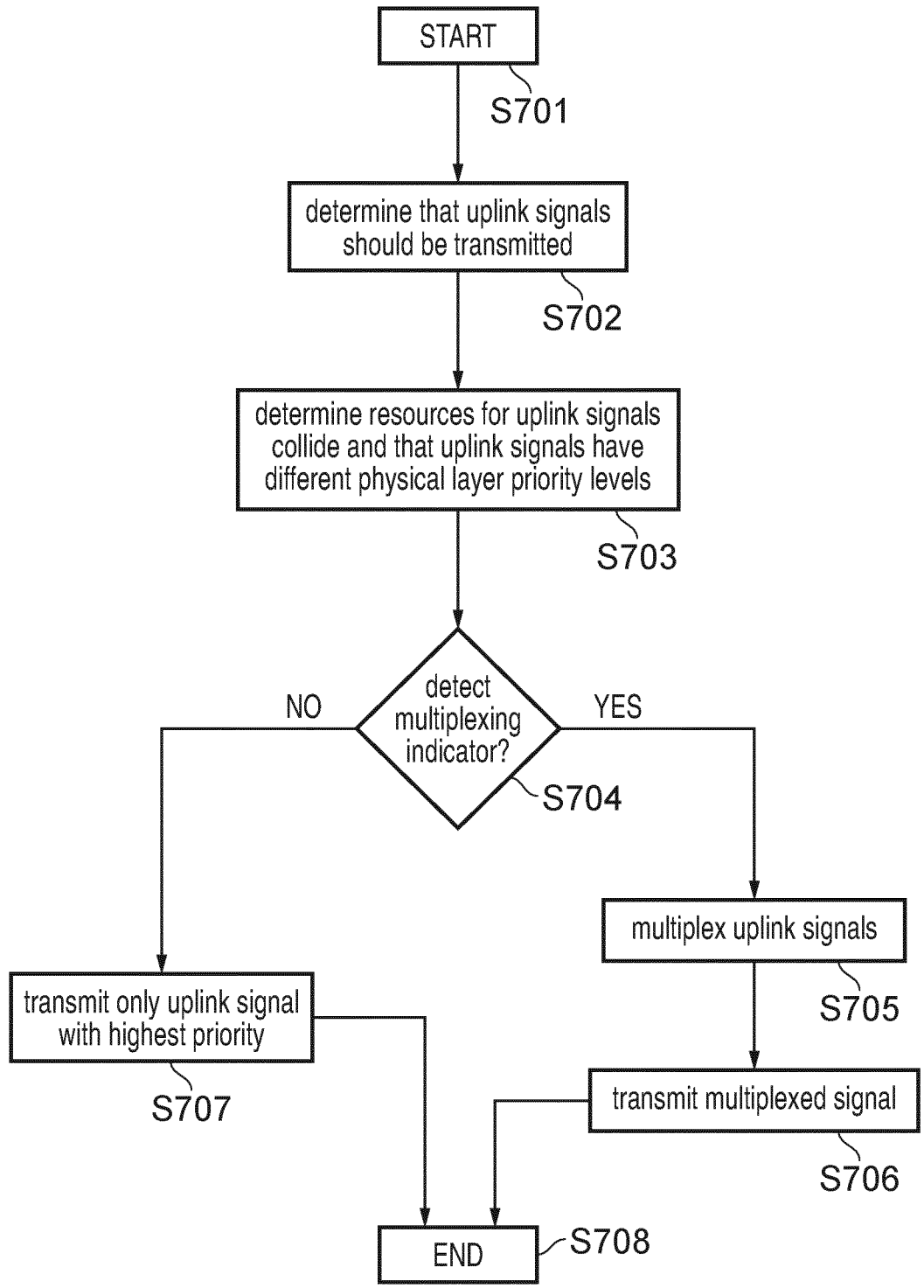
FIG. 7 shows a flow diagram illustrating a process of communications in a communications system in accordance with embodiments of the present technique.

FIG. 7 shows a flow diagram illustrating a first example process of communications in a communications system in accordance with embodiments of the present technique. The process shown by FIG. 7 is a method of operating a communications device configured to transmit data to or receive data from an infrastructure equipment of a wireless communications network.

The method begins in step S701. The method comprises, in step S702, determining that the communications device should transmit at least two uplink signals to the wireless communications network, wherein the uplink signals are each to be transmitted in a set of uplink resources of a wireless access interface. The process then moves to step S703, which involves determining that the set of uplink radio resources in which a first of the uplink signals should be transmitted at least partially overlaps the set of uplink radio resources in which a second of the uplink signals should be transmitted, wherein the first uplink signal has a different one of a plurality of physical layer priority levels to the second uplink signal. Next, in step S704, the method comprises detecting an indication of whether the first uplink signal and the second uplink signal should be multiplexed. The process then comprises, in step S705, if the indication indicates that the first uplink signal and the second uplink signal should be multiplexed, multiplexing the first uplink signal and the second uplink signal into a third uplink signal, and then in step S706, transmitting the third uplink signal. Alternatively, in step S707, the process comprises, if the indication indicates that the first uplink signal and the second uplink signal should not be multiplexed, transmitting only the one of the first uplink signal and the second uplink signal that has a higher physical layer priority level. The method ends in step S708.

Those skilled in the art would appreciate that the method shown by FIG. 7 may be adapted in accordance with embodiments of the present technique. For example, other intermediate steps may be included in the method, or the steps may be performed in any logical order.

Though embodiments of the present technique have been described largely by way of the example communications system shown in FIG. 6, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device in a wireless communications network, the method comprising determining that the communications device should transmit at least two uplink signals to the wireless communications network, wherein the uplink signals are each to be transmitted in a set of uplink resources of a wireless access interface, determining that the set of uplink radio resources in which a first of the uplink signals should be transmitted at least partially overlaps the set of uplink radio resources in which a second of the uplink signals should be transmitted, wherein the first uplink signal has a different one of a plurality of physical layer priority levels to the second uplink signal, and detecting an indication of whether the first uplink signal and the second uplink signal should be multiplexed, wherein, if the indication indicates that the first uplink signal and the second uplink signal should be multiplexed, the method further comprises multiplexing the first uplink signal and the second uplink signal into a third uplink signal, and transmitting the third uplink signal, and wherein, if the indication indicates that the first uplink signal and the second uplink signal should not be multiplexed, the method further comprises transmitting only the one of the first uplink signal and the second uplink signal that has a higher physical layer priority level.

Paragraph 2. A method according to Paragraph 1, wherein the indication is implicit and is determined by the communications device on the basis of at least one of the first uplink signal and the second uplink signal.

Paragraph 3. A method according to Paragraph 2, wherein the first uplink signal comprises first uplink control information, and the second uplink signal comprises second uplink control information.

Paragraph 4. A method according to Paragraph 3, wherein the indication indicates that the first uplink signal and the second uplink signal should be multiplexed if the third uplink signal would comprise a total number of bits equal to or less than a threshold number of bits.

Paragraph 5. A method according to Paragraph 4, wherein the total number of bits of the third uplink signal is calculated by the communications device by adding a total number of bits of the first uplink control information, a total number of bits of the second uplink control information, and a number of bits of a Cyclic Redundancy Check, CRC, to be included within the third uplink signal.

Paragraph 6. A method according to Paragraph 4 or Paragraph 5, wherein the threshold number of bits is configured via Radio Resource Control, RRC, signalling from the wireless communications network.

Paragraph 7. A method according to any of Paragraphs 4 to 6, wherein the threshold number of bits is indicated by the one of a plurality of downlink signals received by the communications device from the wireless communications network that schedules one of the first uplink signal and the second uplink signal.

Paragraph 8. A method according to any of Paragraphs 4 to 7, wherein the threshold number of bits is indicated by one of a plurality of downlink signals received by the communications device from the wireless communications network, the one of the downlink signals indicating that the communications device should transmit an aperiodic Channel State Information, CSI, message which indicates one or more communications characteristics of an uplink data message transmitted by the communications device.

Paragraph 9. A method according to any of Paragraphs 4 to 8, wherein the threshold number of bits is dependent on a maximum code rate, the maximum code rate being configured via RRC signalling from the wireless communications network.

Paragraph 10. A method according to any of Paragraphs 3 to 9, wherein the third uplink signal is transmitted within the one of the set of uplink radio resources in which the first uplink signal was to be transmitted and the set of uplink radio resources in which the second uplink signal was to be transmitted which has the largest capacity.

Paragraph 11. A method according to any of Paragraphs 3 to 10, wherein a plurality of maximum code rates are configured via RRC signalling from the wireless communications network, each of the maximum code rates being associated with one of the plurality of physical layer priority levels.

Paragraph 12. A method according to any of Paragraphs 2 to 11, wherein the first uplink signal comprises uplink control information, and the second uplink signal comprises uplink data.

Paragraph 13. A method according to Paragraph 12, wherein the indication indicates that the first uplink signal and the second uplink signal should be multiplexed if an amount of uplink radio resources of the wireless access interface required to transmit the uplink control information is equal to or less than a threshold percentage amount of the set of uplink radio resources in which the second uplink signal was to be transmitted.

Paragraph 14. A method according to Paragraph 13, wherein the threshold percentage amount is dependent on a scaling factor, the scaling factor being configured via RRC signalling from the wireless communications network.

Paragraph 15. A method according to Paragraph 14, wherein the threshold percentage amount is equal to or less than the scaling factor.

Paragraph 16. A method according to any of Paragraphs 13 to 15, wherein the threshold percentage amount is configured via RRC signalling from the wireless communications network.

Paragraph 17. A method according to any of Paragraphs 13 to 16, wherein the threshold percentage amount is indicated by one of a plurality of downlink signals received by the communications device from the wireless communications network that schedules one of the first uplink signal and the second uplink signal.

Paragraph 18. A method according to any of Paragraphs 12 to 17, wherein a plurality of scaling factors are configured via RRC signalling from the wireless communications network, each of the maximum code rates being associated with one of the plurality of physical layer priority levels.

Paragraph 19. A method according to any of Paragraphs 1 to 18, wherein the indication is explicitly indicated by at least one of a plurality of downlink signals received by the communications device from the wireless communications network.

Paragraph 20. A method according to Paragraph 19, wherein the at least one of the downlink signals comprises a field indicating whether the one of the first uplink signal and the second uplink signal that is based on the at least one of the downlink signals can be multiplexed with another uplink signal of a different physical layer priority level to the one of the first uplink signal and the second uplink signal.

Paragraph 21. A method according to Paragraph 20, wherein the field is a new field specifically for carrying the indication.

Paragraph 22. A method according to Paragraph 20 or Paragraph 21, wherein the field is an existing field repurposed for carrying the indication.

Paragraph 23. A method according to Paragraph 22, wherein the existing field comprises an offset indicator indicating a value of one of a plurality of sets each comprising a plurality of values, the indicated value being for multiplication with a number of bits of third uplink signal to determine a total number of bits required for transmission of the third uplink signal.

Paragraph 24. A method according to Paragraph 23, wherein at least one of the values of at least one of the sets indicates that the first uplink signal and the second uplink signal should not be multiplexed.

Paragraph 25. A method according to Paragraph 23 or Paragraph 24, wherein the set from which the value is indicated is dependent on whether the physical layer priority levels of the first uplink signal and the physical layer priority level of the second uplink signal are the same or different.

Paragraph 26. A method according to any of Paragraphs 23 to 25, wherein the set from which the value is indicated is dependent on a determination made by the communications device, based on a priority indicator in the at least one of the downlink signals, of whether the physical layer priority level of one of the first uplink or the second uplink signal is a high physical layer priority level or a low physical layer priority level.

Paragraph 27. A method according to any of Paragraphs 19 to 26, wherein the indication is explicitly indicated by a Radio Network Temporary Identifier, RNTI, of the at least one of the downlink signals.

Paragraph 28. A method according to any of Paragraphs 22 to 27, wherein the indication is explicitly indicated by a format of the at least one of the downlink signals.

Paragraph 29. A method according to any of Paragraphs 19 to 28, wherein the indication comprises a first dynamic indicator explicitly indicated by a first of the downlink signals on which the first uplink signal is based and a second dynamic indicator explicitly indicated by a second of the downlink signals on which the second uplink signal is based.

Paragraph 30. A method according to Paragraph 29, wherein if the first dynamic indicator and the second dynamic indicator each indicate that the first uplink signal and the second uplink signal should be multiplexed, the method comprises determining that the indication indicates that the first uplink signal and the second uplink signal should be multiplexed.

Paragraph 31. A method according to Paragraph 29 or Paragraph 30, wherein if one of the first dynamic indicator and the second dynamic indicator indicates that the first uplink signal and the second uplink signal should be multiplexed and the other of the first dynamic indicator and the second dynamic indicator indicates that the first uplink signal and the second uplink signal should not be multiplexed, the method comprises determining which of the first downlink signal and the second downlink signal was most recently received by the communications device, and determining that the indication is the one of the first dynamic indicator and the second dynamic indicator that is indicated by the most recently received of the first downlink signal and the second downlink signal.

Paragraph 32. A method according to any of Paragraphs 29 to 31, wherein if one of the first dynamic indicator and the second dynamic indicator indicates that the first uplink signal and the second uplink signal should be multiplexed and the other of the first dynamic indicator and the second dynamic indicator indicates that the first uplink signal and the second uplink signal should not be multiplexed, the method comprises determining which of the first uplink signal and the second uplink signal has the highest physical layer priority level, and determining that the indication is the one of the first dynamic indicator and the second dynamic indicator that is indicated by the downlink signal on which the one of the first uplink signal and the second uplink signal having the highest physical layer priority level is based.

Paragraph 33. A method according to any of Paragraphs 19 to 32, the method comprising determining if the at least one of the downlink signals that explicitly indicates the indication is the downlink signal on which the one of the first uplink signal and the second uplink signal having the lowest physical layer priority level is based, and subsequently transmitting only the one of the first uplink signal and the second uplink signal that has a higher physical layer priority level.

Paragraph 34. A method according to any of Paragraphs 19 to 33, the method comprising determining if the at least one of the downlink signals that explicitly indicates the indication is the downlink signal on which the one of the first uplink signal and the second uplink signal having the highest physical layer priority level is based, and subsequently multiplexing the first uplink signal and the second uplink signal into the third uplink signal, and transmitting the third uplink signal.

Paragraph 35. A method according to any of Paragraphs 1 to 34, wherein the indication is configured via RRC signalling from the wireless communications network.

Paragraph 36. A method according to any of Paragraphs 1 to 35, wherein the indication is dependent on whether either the first uplink signal comprises uplink control information, or the first uplink signal comprises uplink, and the indication is dependent on whether either the second uplink signal comprises uplink control information, or the second uplink signal comprises uplink data.

Paragraph 37. A method according to any of Paragraphs 1 to 36, wherein the indication is dependent on transmission content carried by at least one of the first uplink signal and the second uplink signal.

Paragraph 38. A method according to any of Paragraphs 1 to 37, wherein the indication comprises an explicit indicator and an implicit indicator, the explicit indicator either being dynamically indicated by at least one of a plurality of downlink signals received by the communications device from the wireless communications network or being configured by RRC signalling from the wireless communications network, the implicit indicator being determined by the communications device on the basis of at least one of the first uplink signal and the second uplink signal.

Paragraph 39. A method according to Paragraph 38, wherein if the explicit indicator indicates that the first uplink signal and the second uplink signal should not be multiplexed, the method comprises determining that the indication is the explicit indicator, and subsequently transmitting only the one of the first uplink signal and the second uplink signal that has a higher physical layer priority level.

Paragraph 40. A method according to Paragraph 38 or Paragraph 39, wherein if the explicit indicator indicates that the first uplink signal and the second uplink signal should be multiplexed, the method comprises determining that the indication is the implicit indicator.

Paragraph 41. A method according to any of Paragraphs 1 to 40, wherein at least one of the first uplink signal and the second uplink signal comprises uplink control information.

Paragraph 42. A method according to Paragraph 41, wherein the uplink control information comprises periodic Channel State Information, CSI, which indicates one or more communications characteristics of an uplink data message transmitted by the communications device.

Paragraph 43. A method according to Paragraph 41 or Paragraph 42, wherein the uplink control information comprises a Scheduling Request, SR, which indicates that the communications device is requesting a set up uplink resources of the wireless access interface for transmission of an uplink data message.

Paragraph 44. A method according to any of Paragraphs 41 to 43, wherein the uplink control information comprises feedback information, the feedback information indicating whether or not a downlink signal was received successfully by the communications device.

Paragraph 45. A method according to any of Paragraphs 1 to 44, wherein each of the first and second uplink signals to be transmitted to the wireless communications network are based on one of a plurality of downlink signals received by the communications device from the wireless communications network, the one of the downlink signals indicating of a set of uplink radio resources of the wireless access interface in which the each of the first and second uplink signals should be transmitted.

Paragraph 46. A method according to any of Paragraphs 1 to 45, wherein the third uplink signal is one of the first uplink signal and the second uplink signal, the third uplink signal being formed by multiplexing the other of the first uplink signal and the second uplink signal onto the one of the first uplink signal and the second uplink signal.

Paragraph 47. A communications device suitable for use in a wireless communications network, the communications device comprising
    transceiver circuitry configured to transmit signals and receive signals via a wireless access interface, and
    controller circuitry configured in combination with the transceiver circuitry
    to determine that the communications device should transmit at least two uplink signals to the wireless communications network, wherein the uplink signals are each to be transmitted in a set of uplink resources of the wireless access interface,
    to determine that the set of uplink radio resources in which a first of the uplink signals should be transmitted at least partially overlaps the set of uplink radio resources in which a second of the uplink signals should be transmitted, wherein the first uplink signal has a different one of a plurality of physical layer priority levels to the second uplink signal, and
    to detect an indication of whether the first uplink signal and the second uplink signal should be multiplexed,
    wherein, if the indication indicates that the first uplink signal and the second uplink signal should be multiplexed, the controller circuitry is configured in combination with the transceiver circuitry to multiplex the first uplink signal and the second uplink signal into a third uplink signal, and to transmit the third uplink signal, and
    wherein, if the indication indicates that the first uplink signal and the second uplink signal should not be multiplexed, the controller circuitry is configured in combination with the transceiver circuitry to transmit only the one of the first uplink signal and the second uplink signal that has a higher physical layer priority level.

Paragraph 48. Circuitry for a communications device suitable for use in a wireless communications network, the communications device comprising
    transceiver circuitry configured to transmit signals and receive signals via a wireless access interface, and
    controller circuitry configured in combination with the transceiver circuitry
    to determine that the transceiver circuitry should transmit at least two uplink signals to the wireless communications network, wherein the uplink signals are each to be transmitted in a set of uplink resources of the wireless access interface,
    to determine that the set of uplink radio resources in which a first of the uplink signals should be transmitted at least partially overlaps the set of uplink radio resources in which a second of the uplink signals should be transmitted, wherein the first uplink signal has a different one of a plurality of physical layer priority levels to the second uplink signal, and
    to detect an indication of whether the first uplink signal and the second uplink signal should be multiplexed,
    wherein, if the indication indicates that the first uplink signal and the second uplink signal should be multiplexed, the controller circuitry is configured in combination with the transceiver circuitry to multiplex the first uplink signal and the second uplink signal into a third uplink signal, and to transmit the third uplink signal, and
    wherein, if the indication indicates that the first uplink signal and the second uplink signal should not be multiplexed, the controller circuitry is configured in combination with the transceiver circuitry to transmit only the one of the first uplink signal and the second uplink signal that has a higher physical layer priority level.

Paragraph 49. A method of operating an infrastructure equipment forming part of a wireless communications network, the method comprising
    determining that the infrastructure equipment is going to receive at least two uplink signals from the communications device, wherein the uplink signals are each to be received in a set of uplink resources of a wireless access interface provided by the wireless communications network,
    determining that the set of uplink radio resources in which a first of the uplink signals is going to be received at least partially overlaps the set of uplink radio resources in which a second of the uplink signals is going to be received, wherein the first uplink signal has a different one of a plurality of physical layer priority levels to the second uplink signal, and
    transmitting, to the communications device, at least one of:
    an explicit indication of whether the first uplink signal and the second uplink signal should be multiplexed; or
    a threshold for use by the communications device in conjunction with an implicit indication, detected at the communications device, of whether the first uplink signal and the second uplink signal should be multiplexed,
    wherein the at least one of the explicit indication and the threshold is either comprised in one of the downlink signals or transmitted via Radio Resource Control, RRC, signalling.

Paragraph 50. A method according to Paragraph 49, comprising
    transmitting, to the communications device, the explicit indication,
    wherein, if the explicit indication indicates that the first uplink signal and the second uplink signal should be multiplexed, the method further comprises determining that the infrastructure equipment is going to receive a third uplink signal, the first uplink signal and the second uplink signal having been multiplexed into the third uplink signal at the communications device, and
    wherein, if the explicit indication indicates that the first uplink signal and the second uplink signal should not be multiplexed, the method further comprises determining that the infrastructure equipment is going to receive only the one of the first uplink signal and the second uplink signal that has a higher physical layer priority level.

Paragraph 51. An infrastructure equipment forming part of a wireless communications network, the infrastructure equipment comprising
    transceiver circuitry configured to transmit signals and receive signals via a wireless access interface provided by the wireless communications network, and
    controller circuitry configured in combination with the transceiver circuitry
    to determine that the infrastructure equipment is going to receive at least two uplink signals from the communications device, wherein the uplink signals are each to be received in a set of uplink resources of the wireless access interface,
    to determine that the set of uplink radio resources in which a first of the uplink signals is going to be received at least partially overlaps the set of uplink radio resources in which a second of the uplink signals is going to be received, wherein the first uplink signal has a different one of a plurality of physical layer priority levels to the second uplink signal, and to transmit, to the communications device, at least one of:
an explicit indication of whether the first uplink signal and the second uplink signal should be multiplexed; or
a threshold for use by the communications device in conjunction with an implicit indication, detected at the communications device, of whether the first uplink signal and the second uplink signal should be multiplexed,
wherein the at least one of the explicit indication and the threshold is either comprised in one of the downlink signals or transmitted via Radio Resource Control, RRC, signalling.

Paragraph 52. Circuitry for an infrastructure equipment forming part of a wireless communications network, the infrastructure equipment comprising
transceiver circuitry configured to transmit signals and receive signals via a wireless access interface provided by the wireless communications network, and
controller circuitry configured in combination with the transceiver circuitry
to determine that the transceiver circuitry is going to receive at least two uplink signals from the communications device, wherein the uplink signals are each to be received in a set of uplink resources of the wireless access interface,
to determine that the set of uplink radio resources in which a first of the uplink signals is going to be received at least partially overlaps the set of uplink radio resources in which a second of the uplink signals is going to be received, wherein the first uplink signal has a different one of a plurality of physical layer priority levels to the second uplink signal, and
to transmit, to the communications device, at least one of:
an indication of whether the first uplink signal and the second uplink signal should be multiplexed; or
a threshold for use by the communications device in conjunction with an implicit indication, detected at the communications device, of whether the first uplink signal and the second uplink signal should be multiplexed,
wherein the at least one of the explicit indication and the threshold is either comprised in one of the downlink signals or transmitted via Radio Resource Control, RRC, signalling.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] TR 38.913, "Study on Scenarios and Requirements for Next Generation Access Technologies (Release 14)", $3^{rd}$ Generation Partnership Project, v14.3.0.
[3] RP-190726, "Physical layer enhancements for NR ultra-reliable and low latency communication (URLLC)", Huawei, HiSilicon, RAN #83.
[4] RP-193233, "Enhanced Industrial Internet of Things (IoT) and URLLC support," Nokia, Nokia Shanghai Bell, RAN #86.
[5] TS 38.213, "NR; Physical layer procedures for control (Release 15)", $3^{rd}$ Generation Partnership Project, v15.8.0.
[6] R1-1901594, "UCI Enhancements for NR URLLC," Ericsson, RAN1 #96.
[7] R1-1903955, "UCI enhancements for URLLC," Huawei, HiSilicon, RAN1 #96bis.

What is claimed is:

1. A method of operating a communications device in a wireless communications network, the method comprising:
determining that the communications device should transmit at least two uplink signals to the wireless communications network, wherein the uplink signals are each to be transmitted in a set of uplink resources of a wireless access interface,
determining that the set of uplink radio resources in which a first of the uplink signals should be transmitted at least partially overlaps the set of uplink radio resources in which a second of the uplink signals should be transmitted, wherein the first uplink signal has a different one of a plurality of physical layer priority levels to the second uplink signal, and
detecting an indication of whether the first uplink signal and the second uplink signal should be multiplexed,
wherein, if the indication indicates that the first uplink signal and the second uplink signal should be multiplexed, the method further comprises multiplexing the first uplink signal and the second uplink signal into a third uplink signal, and transmitting the third uplink signal,
wherein, if the indication indicates that the first uplink signal and the second uplink signal should not be multiplexed, the method further comprises transmitting only the one of the first uplink signal and the second uplink signal that has a higher physical layer priority level,
wherein the indication is explicitly indicated by at least one of a plurality of downlink signals received by the communications device from the wireless communications network, and
wherein the indication comprises a first dynamic indicator explicitly indicated by a first of the downlink signals on which the first uplink signal is based and a second dynamic indicator explicitly indicated by a second of the downlink signals on which the second uplink signal is based.

2. The method according to claim 1, wherein the indication is implicit and is determined by the communications device on the basis of at least one of the first uplink signal and the second uplink signal.

3. The method according to claim 2, wherein the first uplink signal comprises first uplink control information, and the second uplink signal comprises second uplink control information.

4. The method according to claim 3, wherein the indication indicates that the first uplink signal and the second uplink signal should be multiplexed if the third uplink signal would comprise a total number of bits equal to or less than a threshold number of bits.

5. The method according to claim 4, wherein the total number of bits of the third uplink signal is calculated by the communications device by adding a total number of bits of the first uplink control information, a total number of bits of the second uplink control information, and a number of bits of a Cyclic Redundancy Check, CRC, to be included within the third uplink signal.

6. The method according to claim 4, wherein the threshold number of bits is configured via Radio Resource Control, RRC, signalling from the wireless communications network.

7. The method according to claim 4, wherein the threshold number of bits is indicated by the one of a plurality of downlink signals received by the communications device from the wireless communications network that schedules one of the first uplink signal and the second uplink signal.

8. The method according to claim 4, wherein the threshold number of bits is indicated by one of a plurality of downlink signals received by the communications device from the wireless communications network, the one of the downlink signals indicating that the communications device should transmit an aperiodic Channel State Information, CSI, message which indicates one or more communications characteristics of an uplink data message transmitted by the communications device.

9. The method according to claim 4, wherein the threshold number of bits is dependent on a maximum code rate, the maximum code rate being configured via RRC signalling from the wireless communications network.

10. The method according to claim 3, wherein the third uplink signal is transmitted within the one of the set of uplink radio resources in which the first uplink signal was to be transmitted and the set of uplink radio resources in which the second uplink signal was to be transmitted which has the largest capacity.

11. The method according to claim 3, wherein a plurality of maximum code rates are configured via RRC signalling from the wireless communications network, each of the maximum code rates being associated with one of the plurality of physical layer priority levels.

12. The method according to claim 2, wherein the first uplink signal comprises uplink control information, and the second uplink signal comprises uplink data.

13. The method according to claim 12, wherein the indication indicates that the first uplink signal and the second uplink signal should be multiplexed if an amount of uplink radio resources of the wireless access interface required to transmit the uplink control information is equal to or less than a threshold percentage amount of the set of uplink radio resources in which the second uplink signal was to be transmitted.

14. The method according to claim 13, wherein the threshold percentage amount is dependent on a scaling factor, the scaling factor being configured via RRC signalling from the wireless communications network.

15. The method according to claim 14, wherein the threshold percentage amount is equal to or less than the scaling factor.

16. The method according to claim 13, wherein the threshold percentage amount is configured via RRC signalling from the wireless communications network.

17. The method according to claim 13, wherein the threshold percentage amount is indicated by one of a plurality of downlink signals received by the communications device from the wireless communications network that schedules one of the first uplink signal and the second uplink signal.

18. A communications device suitable for use in a wireless communications network, the communications device comprising:
    transceiver circuitry configured to transmit signals and receive signals via a wireless access interface, and
    controller circuitry configured in combination with the transceiver circuitry:
    to determine that the communications device should transmit at least two uplink signals to the wireless communications network, wherein the uplink signals are each to be transmitted in a set of uplink resources of the wireless access interface,
        to determine that the set of uplink radio resources in which a first of the uplink signals should be transmitted at least partially overlaps the set of uplink radio resources in which a second of the uplink signals should be transmitted, wherein the first uplink signal has a different one of a plurality of physical layer priority levels to the second uplink signal, and
        to detect an indication of whether the first uplink signal and the second uplink signal should be multiplexed,
    wherein, if the indication indicates that the first uplink signal and the second uplink signal should be multiplexed, the controller circuitry is configured in combination with the transceiver circuitry to multiplex the first uplink signal and the second uplink signal into a third uplink signal, and to transmit the third uplink signal,
    wherein, if the indication indicates that the first uplink signal and the second uplink signal should not be multiplexed, the controller circuitry is configured in combination with the transceiver circuitry to transmit only the one of the first uplink signal and the second uplink signal that has a higher physical layer priority level,
    wherein the indication is explicitly indicated by at least one of a plurality of downlink signals received by the communications device from the wireless communications network, and
    wherein the indication comprises a first dynamic indicator explicitly indicated by a first of the downlink signals on which the first uplink signal is based and a second dynamic indicator explicitly indicated by a second of the downlink signals on which the second uplink signal is based.

19. An infrastructure equipment forming part of a wireless communications network, the infrastructure equipment comprising:
    transceiver circuitry configured to transmit signals and receive signals via a wireless access interface provided by the wireless communications network, and
    controller circuitry configured in combination with the transceiver circuitry:

to determine that the infrastructure equipment is going to receive at least two uplink signals from the communications device, wherein the uplink signals are each to be received in a set of uplink resources of the wireless access interface, to determine that the set of uplink radio resources in which a first of the uplink signals is going to be received at least partially overlaps the set of uplink radio resources in which a second of the uplink signals is going to be received, wherein the first uplink signal has a different one of a plurality of physical layer priority levels to the second uplink signal, and to transmit, to the communications device, an explicit indication of whether the first uplink signal and the second uplink signal should be multiplexed, wherein the explicit indication is comprised in one of the downlink signals, and wherein the indication comprises a first dynamic indicator explicitly indicated by a first of the downlink signals on which the first uplink signal is based and a second dynamic indicator explicitly indicated by a second of the downlink signals on which the second uplink signal is based.

20. The infrastructure equipment according to claim 19, wherein the controller circuitry is configured in combination with the transceiver circuitry to transmit, to the communications device, a threshold for use by the communications device in conjunction with an implicit indication, detected at the communications device, of whether the first uplink signal and the second uplink signal should be multiplexed, wherein the threshold is transmitted via Radio Resource Control, RRC, signalling.

* * * * *